US012671246B2

(12) United States Patent
Doynov

(10) Patent No.:  US 12,671,246 B2
(45) Date of Patent:  Jun. 30, 2026

(54) METHODS AND SYSTEMS FOR PROTECTION OF ELECTRIC NETWORKS AND DEVICES FROM EXTREME TRANSIENT ELECTROMAGNETIC SURGES

(71) Applicant: EMP Shield Inc., Burlington, KS (US)

(72) Inventor: Plamen Doynov, Kansas City, MO (US)

(73) Assignee: EMP Shield Inc., Burlington, KS (US)

( * ) Notice: Subject to any disclaimer, the term of this patent is extended or adjusted under 35 U.S.C. 154(b) by 110 days.

(21) Appl. No.: 18/653,512

(22) Filed: May 2, 2024

(65) Prior Publication Data

US 2025/0343406 A1  Nov. 6, 2025

(51) Int. Cl.
*H02H 9/00*  (2006.01)
*H02H 9/04*  (2006.01)

(52) U.S. Cl.
CPC ............ *H02H 9/005* (2013.01); *H02H 9/042* (2013.01); *H02H 9/045* (2013.01)

(58) Field of Classification Search
CPC ............ H02H 9/04; H02H 5/00; H02H 9/045; H02H 5/005; H02H 3/22; H02H 9/041; H02H 1/04; H02H 3/023; H02H 3/08; H02H 3/105; H02H 3/16; H02H 7/26; H02H 9/005; H02H 9/00; H02H 9/046; H02J 3/1821

USPC .................................................. 361/117–119
See application file for complete search history.

(56) References Cited

U.S. PATENT DOCUMENTS 10,938,204 B1 *  3/2021  Carty .................... H02H 9/005

* cited by examiner

*Primary Examiner* — Danny Nguyen
(74) *Attorney, Agent, or Firm* — AVEK IP, LLC

(57) ABSTRACT

Disclosed are methods and systems for suppressing extreme voltage surges due to transient electromagnetic energy disturbance such as a detonation of a nuclear weapon at high altitude generating an EMP (HEMP) comprising E1, E2, and E3 component pulses. Surge protection assemblies form a surge protection device (SPD) mounted directly on AC and DC power line conductors with embedded overcurrent protection. The inline mounted SPD eliminates connecting wire leads, propagation time delay response, and voltage drops due to wire inductance, providing accurate clamping level responses. The protecting assemblies are selected and coordinated to achieve a predefined response to react at protection threshold voltage levels and with current capacity to mitigate complex components of HEMP. The tertiary protection assembly disconnects an electrical load after a prolonged overvoltage is present associated with a Geomagnetic disturbance and reconnects the electrical load when an overvoltage condition is not present.

20 Claims, 15 Drawing Sheets

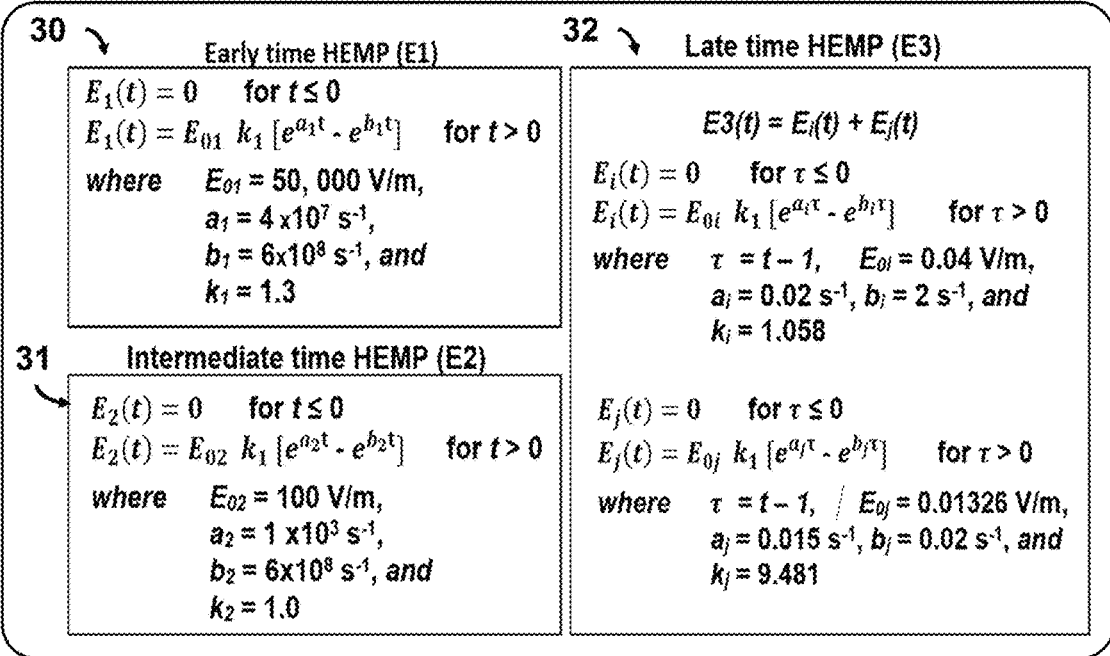

30

Early time HEMP (E1)

$E_1(t) = 0$    for $t \leq 0$
$E_1(t) = E_{01}\ k_1\ [e^{a_1 t} - e^{b_1 t}]$    for $t > 0$
where    $E_{01} = 50,000$ V/m,
$a_1 = 4 \times 10^7$ s$^{-1}$,
$b_1 = 6 \times 10^8$ s$^{-1}$, and
$k_1 = 1.3$

31

Intermediate time HEMP (E2)

$E_2(t) = 0$    for $t \leq 0$
$E_2(t) = E_{02}\ k_1\ [e^{a_2 t} - e^{b_2 t}]$    for $t > 0$
where    $E_{02} = 100$ V/m,
$a_2 = 1 \times 10^3$ s$^{-1}$,
$b_2 = 6 \times 10^8$ s$^{-1}$, and
$k_2 = 1.0$

32

Late time HEMP (E3)

$E3(t) = E_i(t) + E_j(t)$ $E_i(t) = 0$    for $\tau \leq 0$
$E_i(t) = E_{0i}\ k_1\ [e^{a_i \tau} - e^{b_i \tau}]$    for $\tau > 0$
where    $\tau = t - 1$,    $E_{0i} = 0.04$ V/m,
$a_i = 0.02$ s$^{-1}$, $b_i = 2$ s$^{-1}$, and
$k_i = 1.058$ $E_j(t) = 0$    for $\tau \leq 0$
$E_j(t) = E_{0j}\ k_1\ [e^{a_j \tau} - e^{b_j \tau}]$    for $\tau > 0$
where    $\tau = t - 1$,    $E_{0j} = 0.01326$ V/m,
$a_j = 0.015$ s$^{-1}$, $b_j = 0.02$ s$^{-1}$, and
$k_j = 9.481$

| Standard Parameter | Bell Labs (1960s) DEXP | IEC-77C (1993) DEXP | Leuthauser (1994) QEXP | VG95371-10 (1995) DEXP | IEC 61000-2-9 (1996) DEXP |
|---|---|---|---|---|---|
| t10%-90% | 4.6 ns | 2.5 ns | 1.9 ns | 0.9 ns | 2.5 ns |
| Peak Field $E_0$ | 50 kV/m | 50 kV/m | 60 kV/m | 65 kV/m | 50 kV/m |
| FWHM | 18.4 ns | 23 ns | 23.8 ns | 24.1 ns | 23 ns |
| constant | 1.05 | 1.3 | 1.08 | 1.085 | 1.3 |
| α (1/sec) | $4\times10^6$ | $4\times10^7$ | $2.20\times10^9$ | $3.22\times10^7$ | $4\times10^7$ |
| β (1/sec) | $4.76\times10^8$ | $6\times10^8$ | $3.24\times10^7$ | $2.07\times10^9$ | $6\times10^8$ |
| Energy Density | 0.891 J/m² | 0.114 J/m² | 0.167 J/m² | 0.196 J/m² | 0.114 J/m² |

| Waveform parameter | First return stroke | Subsequent strokes |
|---|---|---|
| Average 10%-90% rise time | 14.5 μs | 17.4 μs |
| Average 10%-10% duration time | 244.6 μs | 83.2 μs |
| Average maximum voltage gradient | 0.55 kV/μs | 0.35 kV/μs |
| Average 10%-90% rise time of first peak | 6.9 μs | 5.0 μs |
| Average interval between first and maximum peak | 11.2 μs | 14.6 μs |

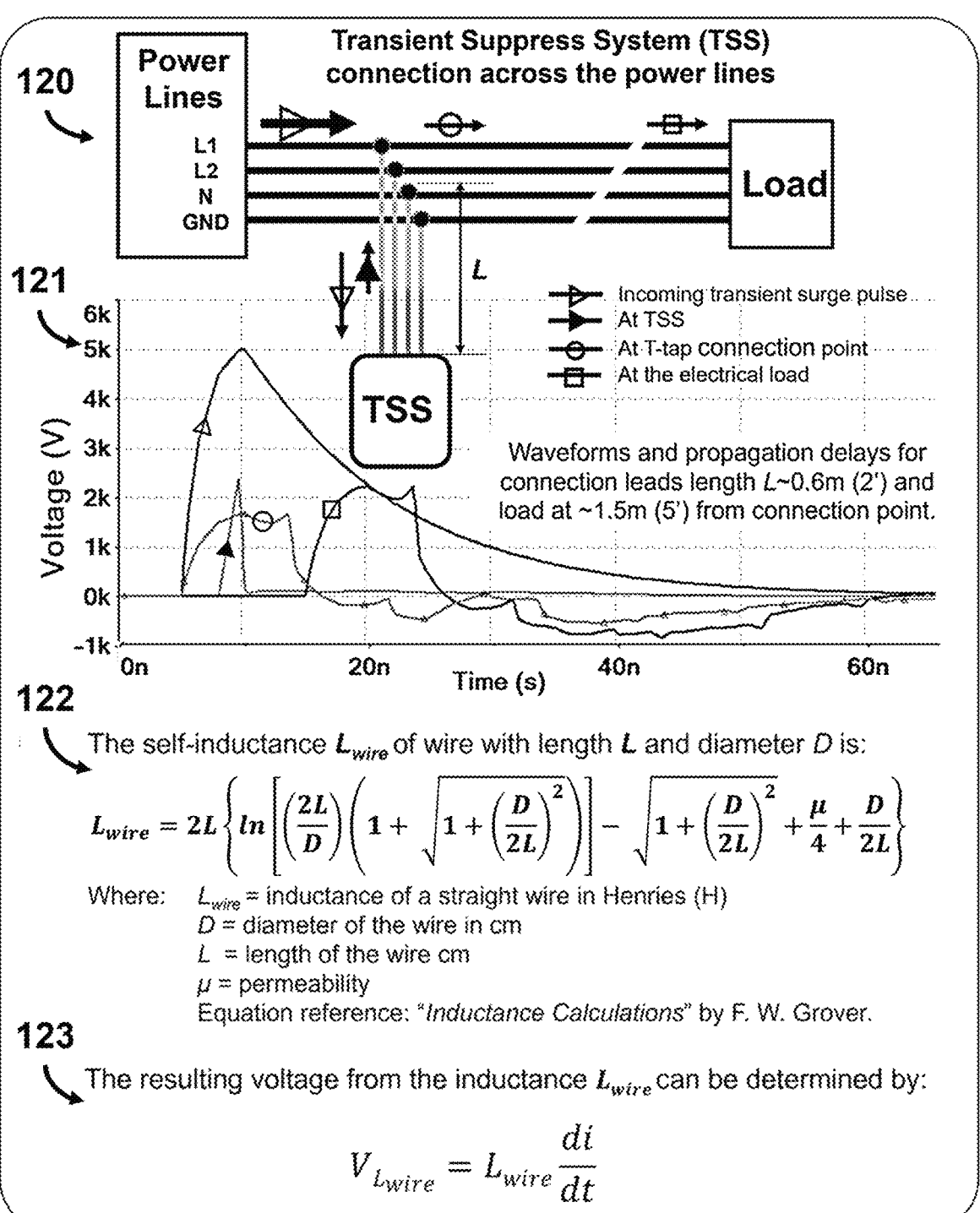

120

Power Lines

Transient Suppress System (TSS) connection across the power lines

L1
L2
N
GND

Load

*L*

TSS

↦ Incoming transient surge pulse
▸ At TSS
⊖ At T-tap connection point
⊟ At the electrical load Waveforms and propagation delays for connection leads length L~0.6m (2') and load at ~1.5m (5') from connection point.

121

Voltage (V) — 6k, 5k, 4k, 3k, 2k, 1k, 0k, -1k

Time (s) — 0n, 20n, 40n, 60n

122

The self-inductance $L_{wire}$ of wire with length $L$ and diameter $D$ is:

$$L_{wire} = 2L\left\{ ln\left[ \left(\frac{2L}{D}\right)\left(1 + \sqrt{1 + \left(\frac{D}{2L}\right)^2}\right)\right] - \sqrt{1 + \left(\frac{D}{2L}\right)^2} + \frac{\mu}{4} + \frac{D}{2L}\right\}$$

Where:   $L_{wire}$ = inductance of a straight wire in Henries (H)
$D$ = diameter of the wire in cm
$L$  = length of the wire cm
$\mu$ = permeability
Equation reference: "*Inductance Calculations*" by F. W. Grover.

123

The resulting voltage from the inductance $L_{wire}$ can be determined by:

$$V_{L_{wire}} = L_{wire}\frac{di}{dt}$$

FIG. 14

METHODS AND SYSTEMS FOR PROTECTION OF ELECTRIC NETWORKS AND DEVICES FROM EXTREME TRANSIENT ELECTROMAGNETIC SURGES

FIELD

The methods and systems relate to mitigating impending effects of extreme transient electromagnetic energy surges on electrical and communication networks and protecting connected electrical and electronic systems from damage.

BACKGROUND

Extreme electromagnetic energy (EM) surges are events with high-magnitude over-voltages and currents exceeding the normal operational range of electrical and electronic devices connected to an electrical distribution network. They may occur randomly and usually for a short time interval. Powerful surges are associated with electrical grid circuit switching, electrostatic discharge (ESD), intentional electromagnetic interference (EMI), nuclear electromagnetic pulses (NEMP), non-nuclear EMP based on high-power electromagnetic (HPEM) sources, narrow, wide, and ultra-wide band frequency content from directed energy weapons (DEW) sources, and high-intensity radiofrequency (HIRF) sources used for jamming. Naturally occurring lightning strikes, geo-magnetic disturbance (GMD), and other natural phenomenon, also produce high-magnitude induced currents, as summarized in block-diagram 10 in FIG. 1. The sources based on natural phenomena or technology-based sources for intentional EMI (IEMI) can impose devastating effects on electrical and electronic infrastructure. To prevent or minimize the damage due to radiated and directly injected electromagnetic disturbance, proper design and installation of protecting and grounding systems is essential to suppress the hazardous effect of a surge, absorb the energy, and/or redirect the energy to ground.

The term electromagnetic pulse (EMP) is used to describe a transient burst of electromagnetic (EM) energy and the associated electromagnetic disturbances due to energy coupling to conductive surfaces and lines. In this document, the term "EMP" is used to describe the electromagnetic fields generated by natural or manmade sources. The terms High-altitude Nuclear EMP (HNEMP or HEMP) are used and refer to the electromagnetic pulse generated by a nuclear bomb detonation at a high altitude in the Earth's atmosphere and resulting in a very large scale EMP having three main components called E1, E2, and E3.

Solar corona Mass Ejection (CME), supernova explosion, and other cosmic phenomenon result in Geomagnetic Disturbance (GMD) and large-scale EM disturbance effects. Natural lightning strikes generate localized EMPs which have characteristics comparable to the E2 of HEMP but comprise many strikes and may have higher field intensity based on the proximity to electrical network.

Several specific parameters correlate the waveform to the intensity and spectral content of the EMP. In the time domain, the EMP is presented with a waveform that describes how the amplitude of the pulse changes in time. The EM energy pulses tend to vary and to be quite complex, so their simplified model descriptions are typically characterized by:

The type of EM energy-radiated EM (direction of propagation, polarization, etc.) coupling, directly injected, conducted, electric, magnetic, etc.

Pulse representation in time domain defined with its waveform rise and fall time, pulse width at half maximum (PWHM), duration, peak amplitude, repetition rate, polarity, and others.

Frequency content and power spectrum distribution (in frequency domain) related to the time domain waveform characteristics.

Analytical expressions and mathematical transformations exist to describe the EMP in time, frequency, and joint time-frequency domains. These interdependent characteristics define a range of impending coupling dependencies and level of damaging effects of excessive transient electromagnetic energy.

It is with these issues in mind, among others, that various aspects of the disclosure were conceived.

SUMMARY

The methods and systems respond instantaneously to overvoltage and overcurrent to absorb and limit the excessive energy coupled to electrical infrastructure networks and protect the connected electrical and electronic systems from damage. In doing so, the methods and systems enhance critical infrastructure resilience and persistent protection readiness. This disclosure describes, among other things, methods and systems for enhanced protection of electrical and electronic systems from electromagnetic pulse-induced electrical transient surges induced by the E1, E2, and E3 components of an electromagnetic radiation complex high-altitude EMP (HEMP), generated by the detonation of a nuclear weapon at high altitude in the atmosphere, intentional electromagnetic interference (IEMI), natural lightning strikes, a Geo-magnetic disturbance (GMD) produced by a coronal mass ejection (CME), or other transient surges due to radiated and conducted electromagnetic interference (EMI).

In one aspect, the methods and systems for instantaneous response to transient electromagnetic surges are cognizant that modern protecting devices are designed and built with surge protection components for limiting, absorbing, switching, and shunting excessive electromagnetic energy. The surge protection devices (SPDs) are described as Types by Underwriters' Laboratories (UL) and as Categories by the Institute of Electrical and Electronics engineers (IEEE) depending on their intended installation allocation. The components used for SPDs have different parameters and functional characteristics to provide solutions to the broad range of pluralities of EMPs from natural and technology-based sources as listed in FIG. 1. They comprise limiting, absorbing, switching, and shunting assemblies including transient voltage suppressors (TVSs), metal oxide varistors (MOVs), gas discharge tubes (GDTs), glass GDTs, avalanche diodes (ADs), avalanche transistors (ATs), spark gap protectors (SPG) and thyristor surge suppressors (TSS), solid state switches, other solid state and nonlinear components based on semiconductors (i.e., Si, Ge), ultra-wideband compound semiconductors (e.g., SiC, GaN, GaAs), mechanical, electrical, and ionization discharge devices (IDDs) as bulk components, distributed metamaterials, and combinations thereof.

In another aspect, the methods and systems for status monitoring of transient electromagnetic SPDs recognize that the devices used for clamping, limiting, absorbing, switching, and shunting are designed to withstand high magnitude voltage and current transients without interfering with the normal operation of the protected electrical networks. The system addresses the complexity of EM energy coupling to different components of infrastructure, different categories transient protection devices are used in combinations to form a hybrid approach to EMP protection. The allowable voltage amplitude levels of the protecting assemblies are selected and combined to achieve a predefined desired response time and protection level capacity to react to and mitigate the E1, E2, and E3 components of a complex multi-phase EMP generated by detonation of a nuclear weapon at high altitude producing a nuclear high altitude EMP (NHEMP). The methods and systems are cognizant to the similarity of waveforms in time domain and their frequency spectrum associated with different EMP sources and address their differences. In a similar aspect, the response time and the voltage limiting and energy handling capacity of the plurality of inline embedded protecting assemblies responds to electromagnetic energy surges induced by intentional EMI, natural lightning strikes, Geo-magnetic disturbance (GMD) from solar corona mass ejection (CME) and comparable to HEMP E3 magneto-hydrodynamic electromagnetic pulse (MHD-EMP), or other However, a fuse or circuit breaker disconnecting the protected electrical loads is not acceptable in many critical operations. The continuous monitoring of the operational status of the SPDs is a viable and proven necessity for providing a timely response and adequate measures depending on the transient surge characteristics, without interference of the normal operations, and continuity of operations with minimal disconnect and automatic reconnect.

In a further aspect, the presented methods and systems provide surge protection of AC and DC power networks with persistent monitoring and operational response to magnitude and time duration of electromagnetic transients to EMI events.

In another aspect, the methods and systems provide solutions to the persistent protection readiness status of installed SPDs which is essential for providing continuous resilience to natural and technology-based surges. The methods address design consideration to improve the performance of the SPDs as system of systems (SoS) comprising utilization of components which complement their individual performance characteristics forming a staged hybrid system of subassemblies without mutual interference. The transient surge suppressing assemblies comprise coordinated characteristics to form a surge protecting device providing advanced protection with higher joule ratings, enhanced capabilities, and the ability to handle larger and more severe power surges.

The systems comprise implementations that may not add additional inductance from lead wires and their response time and energy handling capacity is sequentially stage forming hybrid SPDs and address the complexity of electromagnetic transients. Preventing excessive current draw, overheating, and fire hazard has led to the requirements for surge protection installation after a fuse or circuit breaker, differentiate and provide appropriate response to similar yet different electromagnetic transients.

These and other aspects, features, and benefits of the present disclosure will become apparent from the following detailed written description of the preferred embodiments and aspects taken in conjunction with the following drawings, although variations and modifications thereto may be affected without departing from the spirit and scope of the novel concepts of the disclosure.

BRIEF DESCRIPTION OF THE DRAWINGS

The accompanying drawings illustrate embodiments and/ or aspects of the disclosure and, together with the written description, serve to explain the principles of the disclosure. Wherever possible, the same reference numbers are used throughout the drawings to refer to the same or like elements of an embodiment, and wherein:

FIG. 6 presents summary groups of the commonly used analytical expressions for the HEMP E1, E2, and E3 waveforms with the model parameter values, according to an example of the instant disclosure.

FIG. 7 displays a table with the parameter values for the HEMP E1 waveform and their changes as the models and standards describing the HEMP E1 environment have evolved according to an example of the instant disclosure.

FIG. 14 presents a block diagram of a generalized view of surge protection device installation across the power lines and the simulation plots of the incoming transient pulse and the resulting waveforms due to SPD response and the effect of connecting lead wires inductance, according to an example of the instant disclosure.

DETAILED DESCRIPTION

Figure 1:
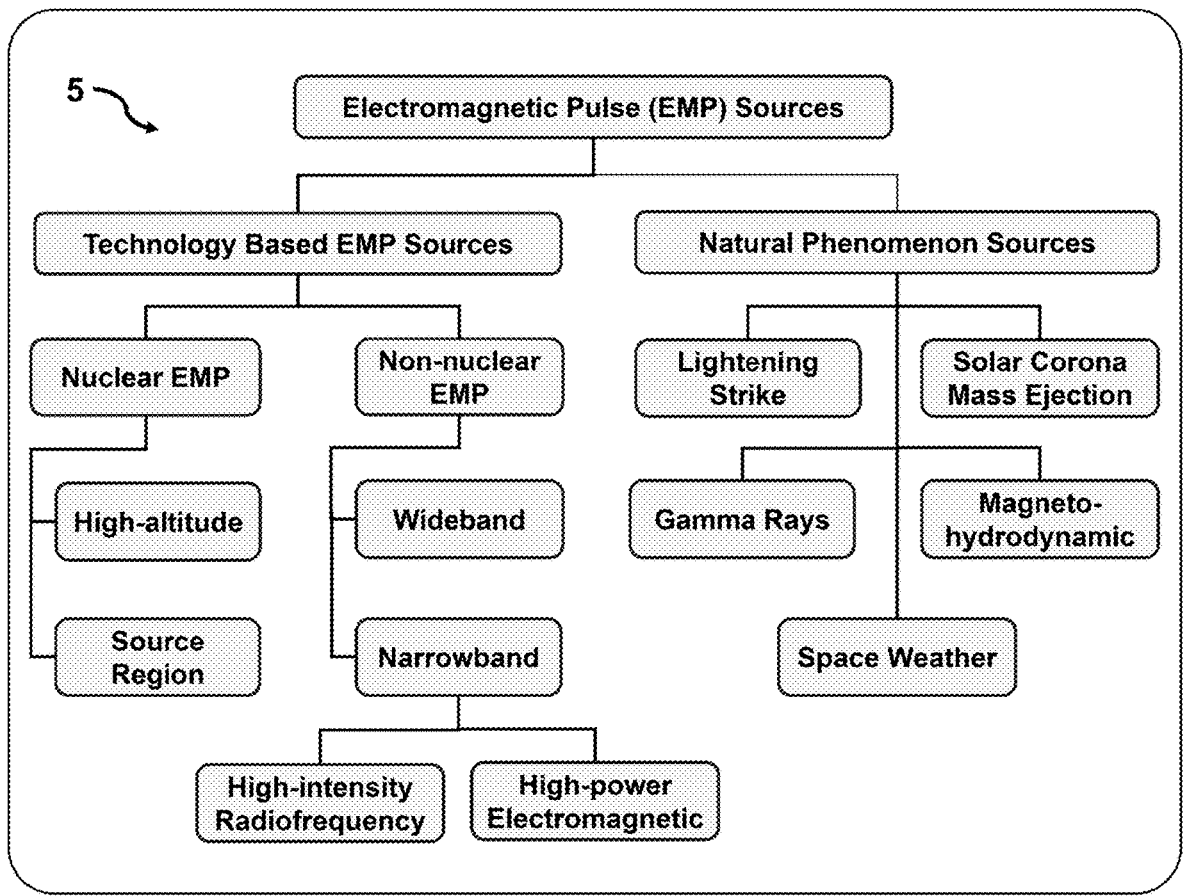
FIG. 1 displays a view diagram of the sources of powerful electromagnetic surges, referred to as electromagnetic pulse (EMP), such as naturally occurring phenomena and technology-based sources, according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may affect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways and does not require any of the specific features described herein. Also, well-known functions or constructions are not described in detail since they would obscure the invention with unnecessary detail. Any signal arrows in the drawings/figures and labeled components should be considered only as exemplary, and not limiting or exhaustive, unless otherwise specifically noted. Further, the description is not to be taken in a limiting sense but is made merely for the purpose of illustrating the general principles of the invention, since the scope of the invention is best defined by the appended claims.

It will be understood that, although the terms "first," "second," etc., as well as "primary", "secondary," etc., may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise.

It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted. In some alternative implementations, the functions/acts noted may occur out of the order noted in the figures. For example, two figures shown in succession may in fact be executed substantially concurrently or may sometimes be executed in the reverse order, depending upon the functionality/acts involved.

It should also be noted that the terms surge suppression and surge protection are often used interchangeably. However, there are key differences between the two. Surge suppressors offer basic protection against power surges, diverting excess voltage and extending the lifespan of electronic devices. Surge protectors provide advanced protection with higher Joule ratings, enhanced capabilities, and the ability to handle larger and more severe power surges. They offer expanded coverage and additional features. In this article, we will explore the concepts of surge suppressors and surge protectors, with the understanding that combinations of surge suppressing components form transient surge suppressing assemblies (TSSAs). Combined utilization of TSSAs with complimentary characteristics are used to form a surge protection device (SPD) with expanded capacity and additional functionalities.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The characteristics of an electromagnetic pulse (EMP), in general, and high-altitude nuclear EMP (HNEMP), in particular, depend on the source and must be considered in the context of traditional electrical environments and setups before being described in detail and in regard to protection of electrical and electronic systems. Electromagnetic energy (EM) surges are phenomena where over-voltages and currents exceeding the normal operational range occur for a short period of time. To prevent or minimize the damage due to electromagnetic disturbance, proper design and installation of an EMI protection and grounding system is essential to suppress the hazardous effect of a surge, absorb the energy, and/or redirect the energy to ground. FIGS. 1 to 10 are included to supplement the description of the physical phenomena that result in the extreme intensity of natural sources and high altitude EMP and its broadband frequency content, as shown in the figures and tables. It is shown that part of a nuclear high altitude EMP resembles the characteristics of frequently occurring natural lightning strikes, and others are reminiscent to Geo-magnetic disturbance (GMD) events. The man-made directed energy sources for intentional EMI have capabilities to generate more complex waveforms in time domain and variations of spectral content and distribution that must be accounted during the design and implementation of SPDs.

FIG. 1 displays a view diagram 5 of the sources of powerful electromagnetic surges, referred to as electromagnetic pulse (EMP), such as naturally occurring phenomena and technology-based sources, according to an example of the instant disclosure.

Figure 2:
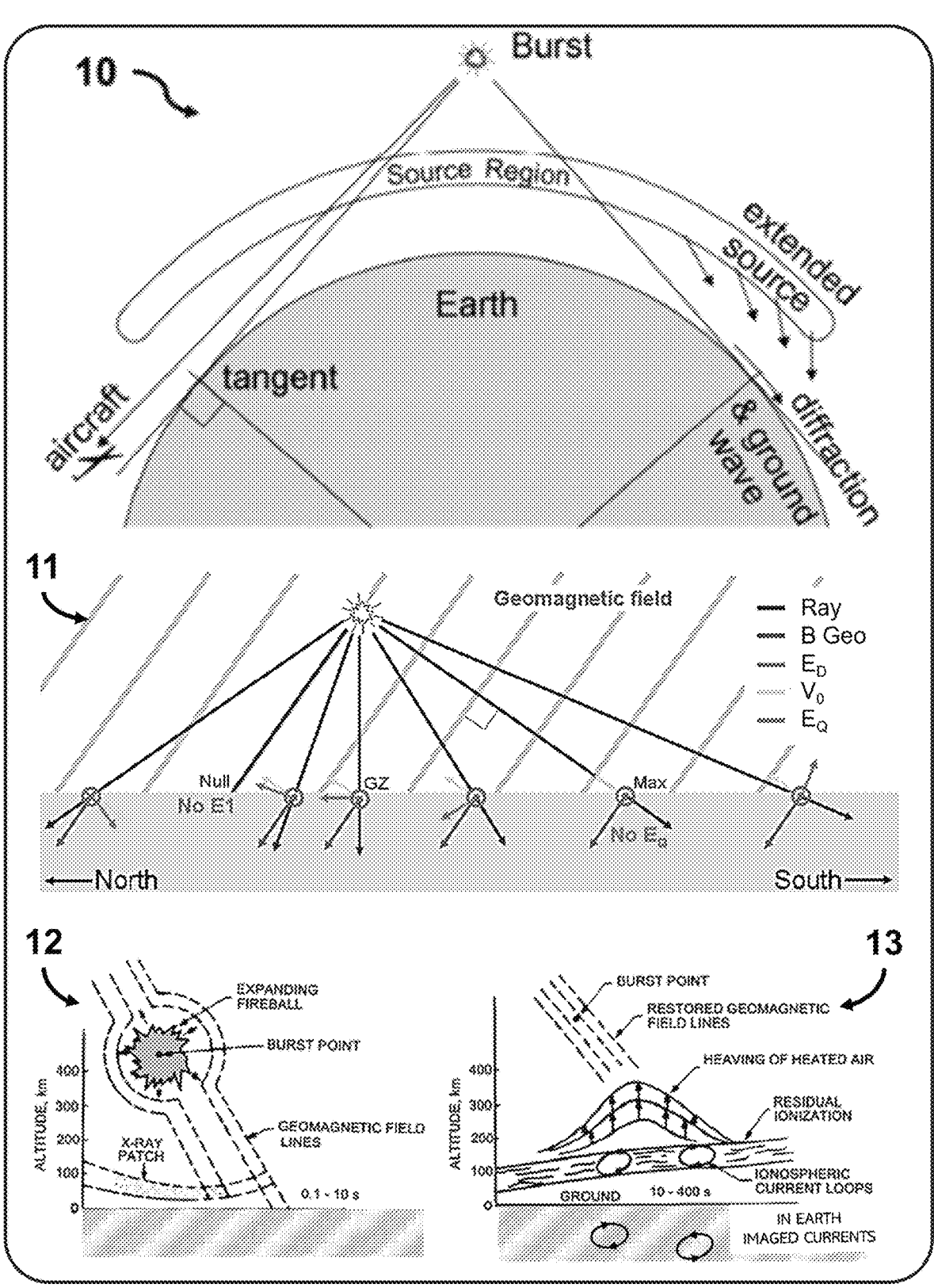
FIG. 2 contains a pictograph of the formation of an atmosphere source region, as a result of a high-altitude nuclear blast (HEMP), a pictograph illustrating the electromagnetic pulse (EMP) characteristics dependance with respect to Geolocation and Geomagnetic field, and pictographs displaying the formation of magnetohydrodynamic EMP, according to an example of the instant disclosure.

A pictograph 10 in FIG. 2 shows an electromagnetic pulse formation generated by a high-altitude nuclear explosion in the atmosphere at high altitude according to an example of the instant disclosure. The directional wave propagation towards the Earth's surface with the electric and magnetic components is illustrated by pictograph 11. The late time HEMP E3 magnetohydrodynamic formation is illustrated with pictographs 12 and the resulting current loops with pictograph 13, according to an example of the instant disclosure.

Figure 3:
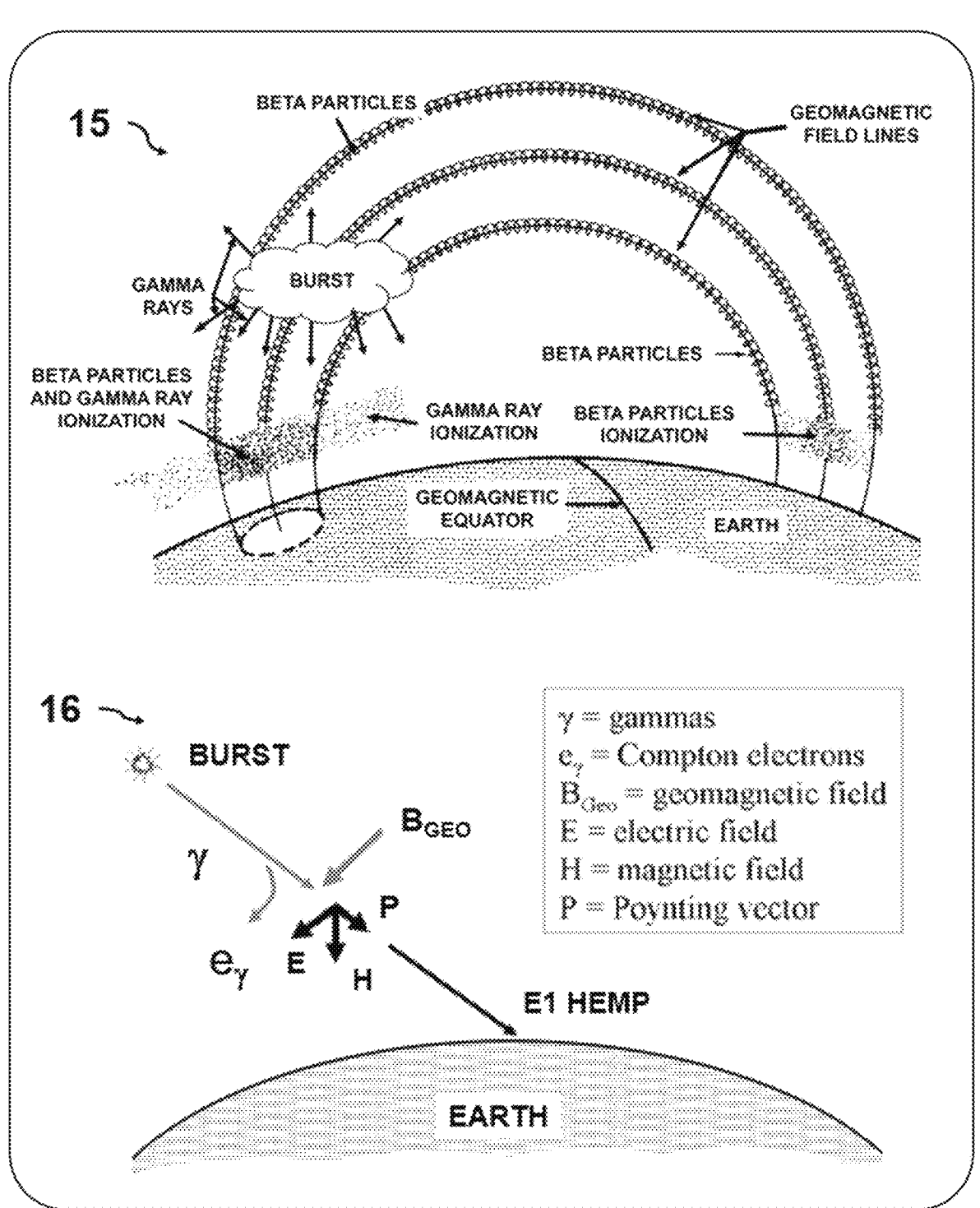
FIG. 3 displays pictographs of a nuclear burst high-altitude electromagnetic pulse formation due to the interactions of gamma rays and beta particles with the Geomagnetic field, the generation of the Compton electrons and the Electro-magnetic Field (EMF) Poynting vector direction with respect to the observer's location on the Earth's surface, according to an example of the instant disclosure.

The current understanding of high-altitude nuclear EMP is based on the interactions of the blast-generated high-energy gamma rays with atoms in the atmosphere that produce electrons which interact with the Geo-magnetic field producing EM field with a Poynting vector from the burst source towards the Earth's surface as shown with pictographs 15 and 16 in FIG. 3 according to an example of the instant disclosure. The field generated by a high-altitude EMP (HEMP) has direction variation along a north-south central line and over the horizon extended effects, as illustrated with the Electromagnetic Field (EMF) Poynting vector direction with respect to the observer's location. The intensity of the pulse varies by location (latitude) due to the Geo-magnetic field distribution. Some additional relevant factors will be discussed further while the detailed specifics of the related physical phenomena are beyond the scope of this application.

Figure 4:
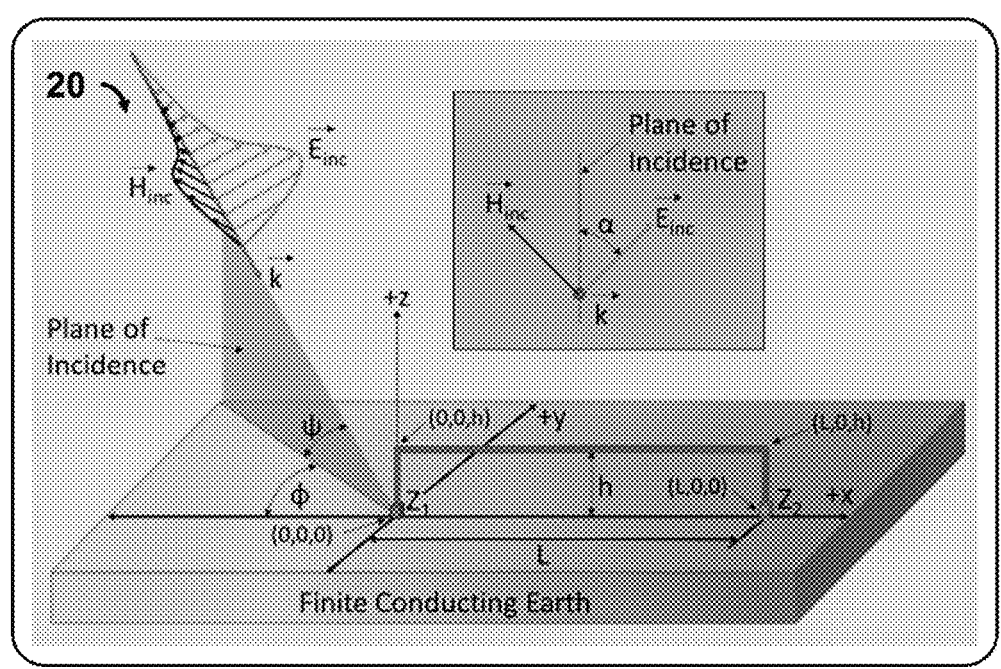
FIG. 4 displays a pictograph to illustrate the EM wave and its E (electric) and H (magnetic) vectors in the plane of incidence at an electric transmission wire at height h above the ground surface and the three associated angles ($\alpha$, $\phi$, and $\psi$) indicative for the importance of the infrastructure configuration with respect to Electromagnetic field (EMF) susceptibility, according to an example of the instant disclosure.
Figure 5:
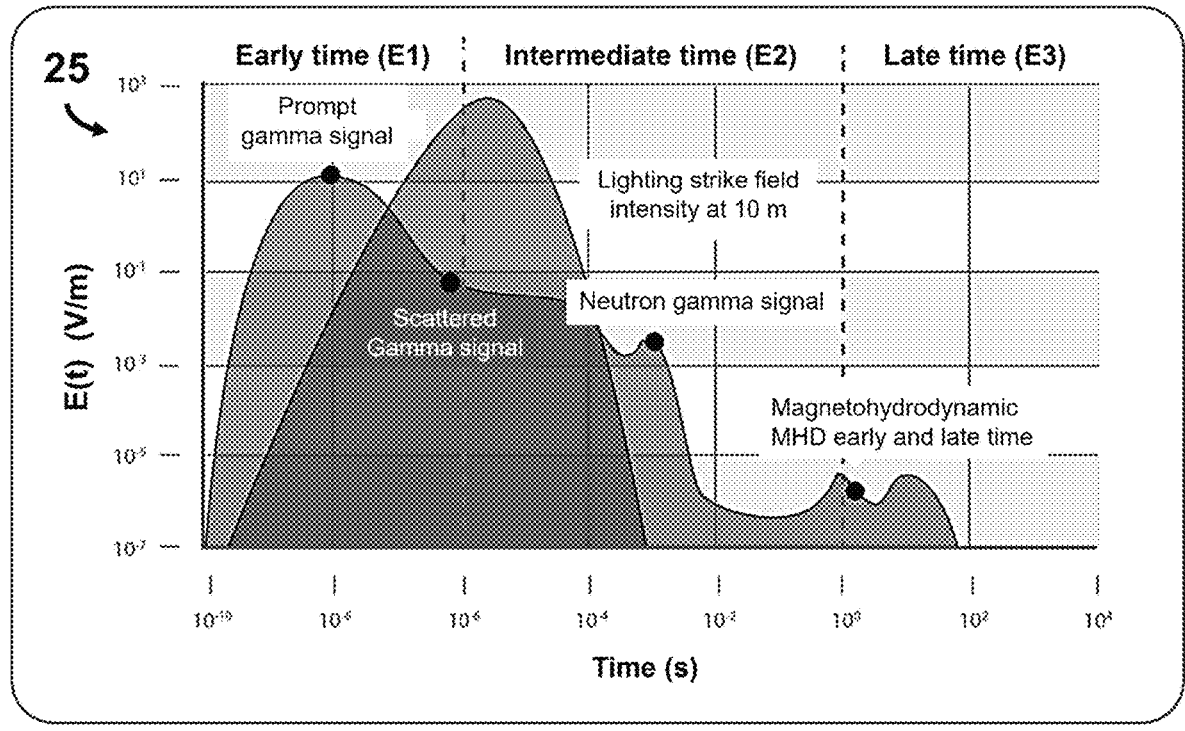
FIG. 5 presents a plot of the complex high-altitude electromagnetic event presented in time domain as a multipulse with a sequence of three E1, E2, and E3 phases (Early, Intermediate, and Late time periods) of the HEMP with the superimposed for comparison EM field intensity of a lightning strike, according to an example of the instant disclosure.

An EMP event can induce voltages and corresponding currents into multiple and different electrical systems. The voltage/current magnitudes depend on the coupling of the EM field with the system (its susceptibility) and the characteristics of the EM wave (direction, polarization, frequency content, and others). The long and exposed transmission lines of wide-area power distribution grids, as well as the electrical systems of localized mini-grids, renewable energy systems, communication lines, homes' wiring, commercial buildings, and even vehicle electrical systems. A pictograph 20 in FIG. 4 illustrates the coupling of the EM energy into a transmission line at height h above the ground (Earth's surface) according to an example of the instant disclosure. The pictograph displays a few key relations of the Electric field (E) and Magnetic field (B) using the Half-space Earth model. The image is from "The Early-time (E1) HEMP and its impact on the US Power Grid" report, written in 2010 by Savage et al., Metatech Corp., and provides an excellent analysis of the physical phenomena associated with the HEMP.

Without proper protection measures, over-voltage surges can disturb, damage, or destroy components within the electrical systems in the area of impact, diminishing the operability of the electrical system or rendering it unusable until repaired. Persistent and successful protection is possible only with implementation of adequate surge shielding (e.g., Faraday cage) and/or methods for surge limiting and energy redirection and absorbing. For example, multiple methods and tools are developed and used for surge protection from EM energy associated with lightning. While the duration of a lightning strike appears very short (microseconds, $\mu s$, or $10^{-6}$ s), it is orders of magnitude longer than the duration of what is known in the literature as the E1 HEMP, which is order of nanoseconds, (ns, or $10^{-9}$ s). As shown in FIG. 2, due to its origin, a HEMP will induce effects in a very large area. Similarly, it is understood that a massive solar corona mass ejection (CME) reaching the Earth results in Geomagnetic disturbance (GMD) generating extremely low frequency induced currents with damaging effects on electrical infrastructure.

Unlike the electromagnetic radiation or transient pulses associated with common natural phenomena (lighting strikes, transmission lines overvoltage, and overcurrent surges, etc.), the HEMP comprises of more complex time and frequency domain characteristics. The HEMP is described with several stages in time following the nuclear blast, usually referred to as Early, Intermediate, and Late time. They are also known as HEMP phases or pulses of varying waveform (magnitude, duration, frequency content, etc.) illustrated with plot 25 in FIG. 5. Therefore, the HEMP is more accurately considered as a complex, electromagnetic multi-pulse event, usually described in terms of sequence of three primary components defined by the International Electrotechnical Commission (IEC) as E1, E2, and E3 phases of the high-altitude EMP (HEMP). The characteristics of these phases (pulses) of HEMP are further described in this application. The relative electric field strength of the time sequence is displayed in a plot 25 in FIG. 5 using a logarithmic scale for the electric field strength E (V/m) vs Time(s). Some of the commonly used analytical expressions for the HEMP E1, E2, and E3 waveforms are given in FIG. 6 with groups 30, 31 and 32, respectively. The accepted values for the variables and coefficients in the analytical expressions are also given.

Starting in the 1960s, multiple waveform models have been developed to establish standards for testing the effects and the associated hazardous effects. The series of standards related to the description of the associated waveforms are known as IEC 77C Standards. The evolution of the unclassified standards with respect to the E1 HEMP environment can be seen in a Table 35 in FIG. 7, which displays the evolution of the waveform parameters of the unclassified HEMP E1 environment Standards.

Lightning strikes are common physical phenomena in nature and are one of the main causes of electric power apparatus failure as well as power interruptions. To assess the susceptibility, level of effects and damages of electric power equipment, standard lightning impulse, with the wave front/tail time of 1.2/50 us is recommended by the IEC Standard and used in the impulse voltage withstand tests. However, the standard lightning impulse waveform is a statistic result obtained on the transmission lines or towers for triggering lightning, which only can be regarded as a certain kind of lightning impulse waveform. As a side note, the visually perceived lightning strike is a sequence of current discharges. More than 90% of the lightning strikes in nature have a negative polarity. Some additional details of the lightning associated pulse waveform characteristics are given in a Table 40 in FIG. 8.

Figure 8:
FIG. 8 displays a table of lightning strikes waveform average characteristics according to an example of the instant disclosure.
Figure 9:
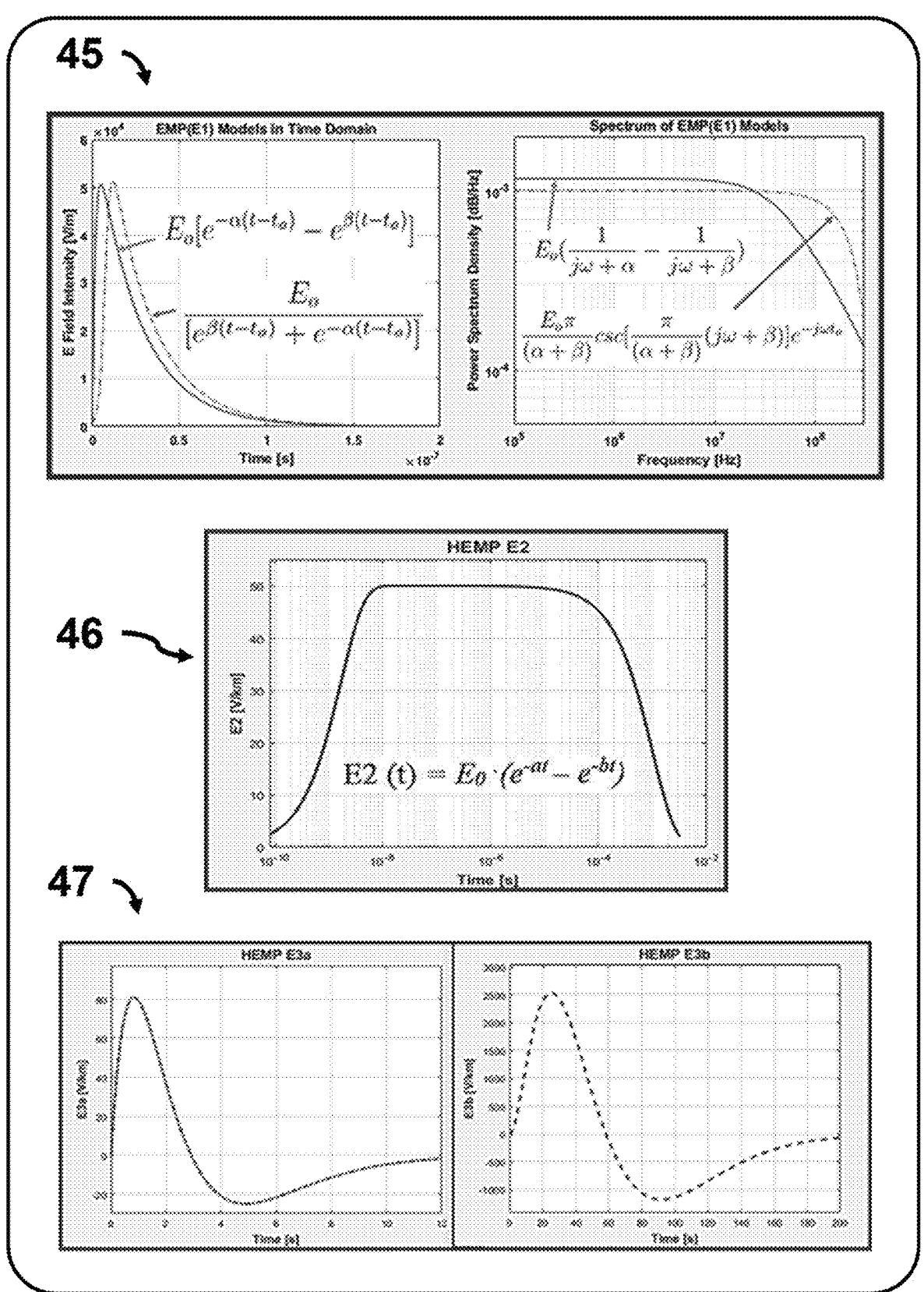
FIG. 9 displays most common analytical expressions for a HEMP E1 waveform model, HEMP E2 waveform, and HEMP E3 models, according to an example of the instant disclosure.

To better analyze the waveform characteristics of induced voltages on the overhead transmission lines by natural lightning, the standard voltage waveforms are in terms of rising time, maximum voltage gradient, and the 10% to 90% rise time to peak value, overall duration time, etc. and some published results are summarized in the Table 40 in FIG. 8 for a reference and comparison with the HEMP E2 characteristics. As seen in FIG. 8, the average 10%-90% first peak time for the induced voltage waveform of first return strokes is 6.9 s, and the interval between first peak and maximum peak is 11.2 s of the first return stroke. The average duration time of the induced voltage waveform of the first return strokes is 244.6 μs (from 10% rise time to 10% of peak value on the fall time), and that of the subsequent return strokes is 83.2 μs. The average 10%-90% rising time of the induced voltage waveform of the first return strokes is 14.5 μs, and its counterpart for subsequent return strokes is 17.4 μs, and induced voltages of the first return stroke are bigger than that of the subsequent ones and, therefore, the average maximum voltage gradient are respectively (0.55 kV/μs) is larger than that of the latter (0.35 kV/μs).

The most common analytical expressions for E1 HEMP are the Difference of double exponential (DEXP) and the Quotient of exponentials (QEXP) as shown in Table 35 in FIG. 7. The superimposed DEXP and QEXP plots of E1 HEMP model in time domain are presented in 45, FIG. 9, left, and their respective spectral distributions in frequency domain are presented with superimposed plots 45 in FIG. 9, right. A plot 46 in FIG. 9 displays the waveform of E2 HEMP (Intermediate time) model and its DEXP analytical expression. The double exponential waveform for the lightning strike model has coefficient constants that reflect the slower rise and fall times (μs). When necessary, to express the negative polarity, the formulae is written with a negative sign for the amplitude. Plots 47 in FIG. 9 display in time domain the waveforms associated with the two phases of Late time E3 HEMP.

Figure 10:
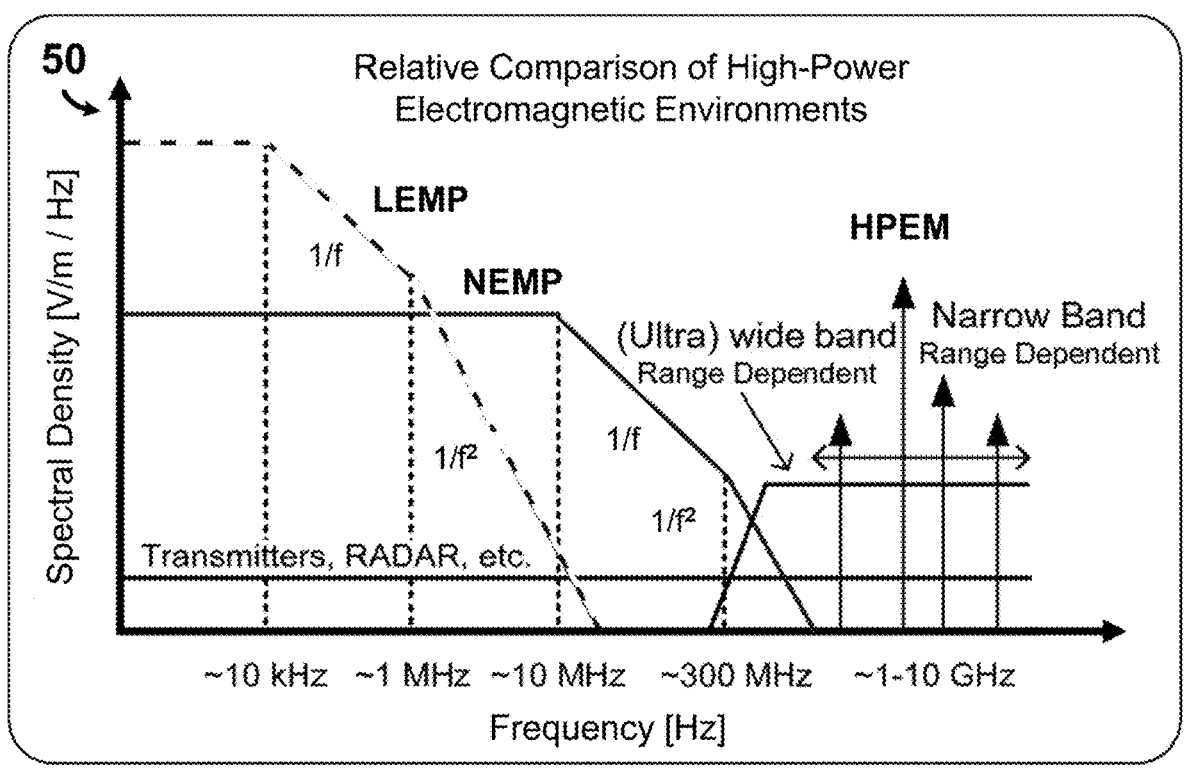
FIG. 10 presents a plot with relative comparison of high-power electromagnetic environments according to an example of the instant disclosure.

The damage to electrical and electronic devices is determined by the amount of energy and the rate at which the energy is transferred to devices in the electromagnetic environment. All electrical or electronic equipment devices are susceptible to some level which may result in disturbance, malfunctions, or permanent damage under electromagnetic radiation of sufficient intensity. The frequency content of the waveform plays a major role in the coupling mechanism (the susceptibility and, respectively, the immunity of a system). The superimposed plots in FIG. 10 illustrate the power spectrum density distribution (V/m-Hz) associated with HEMP E1, atmospheric lightning strikes, and wideband IEMI (high-power microwave, high-intensity RF) generated from different directed energy sources.

The level of system vulnerability is dependent on the intensity of the EMF and the coupling of the external fields to the electrical circuits and the sensitivity characteristics of circuits components. A temporary malfunction (or upset) can occur when an electromagnetic field induces current(s) and voltage(s) in the operating system electronic circuits at levels that are within the rated upper limits of components' characteristics. Regardless the source of EMI, two principal radiation coupling modes are recognized in the literature and the relevant standards assessing how much radiated power is coupled into target systems: (1) "front door" coupling, (FDC), and (2) "back door" coupling, (BDC). The FDC is typically observed when the power radiated from the RF/HPM source is directly coupled into the communication input of electronic systems. The antenna subsystem is designed to receive and transmit RF signals, and thus provides an efficient path for the EM energy flow from the electromagnetic environment to enter the equipment and cause damage especially when the antenna's bandwidth is within the frequency range of the EM source. As seen in superimposed plots 50 in FIG. 10, the HEMP E1 has a very broad bandwidth. While the low frequencies (long wavelengths) couple to long conductor (electrical transmission line, pipelines, etc.), the higher frequencies (shorter wavelength) couple via small apertures, making effective shielding more challenging.

The BDC occurs when the electromagnetic field from the source produces large transient voltage/currents or the EM waves propagate and couple through the gaps, small apertures, fixed electrical wiring and interconnecting cables, connections to the power mains, communication cables, network and telephone copper wires, unshielded sections, and others. The BDC can generally be described as a wide-range interference at specific narrow-band susceptibility characteristics because of existing apertures and modes of coupling to cables.

Since the impinging EMP field has a broad frequency spectrum and a high field strength, the antenna response must be considered both in and out of the antenna's band. The inadvertent, unintended, or parasitic antennae are electrically penetrating conducting structures, power lines, communication cables, and others that collect EMP energy and allow its entry into a building, a device, or an enclosure. The lines of the electrical grid can be considered as antenna pathways connected to the upstream and downstream components of the grid and are susceptible to broadband frequencies, including the lower frequency (long wavelength) coupling due to the long length of the power transmission lines. Additional factors influence the level of coupling and interference: wave polarization, geolocation, ground surface conductivity, height of the wires above ground, and others. With their long length, the electrical transmission lines are also susceptible to the E3 HEMP, as further described below.

The internal electrical wirings of a building are susceptible to EMF and would couple directly to the radiated field if the building is without proper shielding. The exposed long wires or internal unshielded wires are susceptible to the radiated field. Without proper mitigation, the induced currents generate magnetic fields that couple the neighboring conductive lines and surfaces. Protection from radiated coupling of EM field is achieved by shielding equipment with a conductive enclosure. In some special cases, the whole building is a shielded structure commonly known as a Faraday cage. Because input and output cables for power and communications must be present, special methods are employed to lower and limit the propagation of the induced transients via these wired connections and their conduit openings.

Terrestrial vehicles, aircraft, and marine vessels may be considered special cases when evaluating their susceptibility to EMI. Terrestrial vehicles are poor incomplete conductive cages with different sizes, multiple apertures, and without direct contact with the Earth's surface. The aircraft may be modeled as a Faraday cage with limited distributed apertures. Marine vessels represent a good approximation of a Faraday cage for all equipment below deck (metal vessels) and an open exposure to all equipment above deck. The relative standards that evaluate the EM susceptibility address these differences.

A proper grounding of the electrical infrastructure is of great importance for providing passive shielding with a Faraday cage and active transient surge suppression using voltage limiting, energy absorption, and redirection. Grounding systems are well understood and used for terrestrial and naval installations. However, connection to Earth's ground is not applicable for flying aircraft and mobile terrestrial vehicles. With respect to some special cases, a conducting strap or metal chain is used on vehicles to provide a conductive path to ground. The metal marine vessels in saltwater have good contact with conductive media. There are ways to provide a contact for vessel with non-conductive body.

The term "grounding" is used in North America and accepted by Institute of Electrical and Electronics Engineers (IEEE). It is the equivalent term to "earthing", used in European Union and adapted by the International Electrotechnical Commission (IEC)—an international standards organization that prepares and publishes international standards for all electrical, electronic and related technologies. Grounding/earthing arrangements differ in the existence (whether present or not) and location of the connections of neutral-to-case (neutral-to-case bonding), of equipment-to-ground (equipment grounding), and of neutral-to-ground (system grounding). There are various terms regarding grounding/earthing and bonding.

Abbreviations of grounding systems are usually denoted by a combination of the first letters of the French words: «Terre»-ground, «Neutre»-neutral, «Isolé»-isolate, and the English words: «combined» and «separated». The use of these letters describes the grounding configuration: T—Grounding; N—Connection to neutral; I—Isolation; C—combined functions: combining the functional and protective neutral wires; and S—The separate use of functional and protective neutral wires throughout the entire grid.

The designated letters in combination TT, IT, TN, TN-C, TN-S, and TN-CS are used to refer to different types of electrical system earthing arrangements:

TT (Terre-Terre) system has a separate earth electrode for the electrical installation and for the consumer's equipment.

IT (Isolé-Terre) system has no connection between the power supply neutral and earth and relies on insulation monitoring for safety.

TN (Terre-Neutre) system has a combined neutral and protective earth, with different variations such as TN-C, TN-S, and TN-CS.

TN-C (Terre-Neutre Combiné) combines the neutral and protective earth in a single conductor.

TN-S (Terre-Neutre Séparé) separates the neutral and protective earth conductors throughout the installation.

TN-CS (Terre-Neutre Combine Séparé) is a combination of TN-C and TN-S systems, with the neutral and earth conductors separated in some parts of the installation and combined in others.

In terms of safety, the TN-S and TT systems are generally considered safer due to the separation of the neutral and protective earth conductors, which reduces the risk of electric shock in case of a fault. However, the safety of an electrical system depends on various factors including installation, maintenance, and compliance with regulations.

One possible way to mitigate the effects of EMP is to provide a response in real time to an event and disconnect the protected systems by isolating them physically from long cables, wires, antennas, etc. Specifically, to protect from the damaging effects of EMP, the environment may be persistently monitored with applicable sensors and when a HEMP is detected, the appropriate isolation systems can be triggered to provide protection for the infrastructure. Given the high speed of the HEMP E1 event, this is not an easy task, has major constraints, and the very limit of abruptly disconnecting current flow especially in high-power installations.

A straightforward protection method is EMI shielding and to equip the electrical and electronic systems with conventional devices that prevent the excessive magnitude of voltage and current from reaching the electrical load and absorb and redirect the energy of the EMP. Generally, these devices are known as surge suppressors and arrestors. Most commercially available surge suppressing devices are designed and built to offer protection to lightning with micro-seconds response times. This is not sufficient for protection from the E1 HEMP with a few nanoseconds rise time and from IEMI with variable characteristics (rise time/frequency content and repetition rate). It is important to note that localized, small capacity surge protection devices exist and are commercially available. Following up the standards specifications, the surge protection devices (SPD) are implemented as type 1, 2, and 3 with respect to the point of installation. SPDs for a split-phase 120 VAC and for three phase 277/480 VAC system are manufactured by different vendors.

The SPDs have different technical specifications with a focus on current and energy handling capacity. Most of the commercially available transient surge protection systems are designed and implemented to be connected across the AC power lines, commonly referred to as a T-tap type connection, which does not provide in series installation with the AC power lines (like the high-power filters, for example). Protection against transient overvoltage must be provided between live conductors and PE (common mode protection), and/or between live conductors (differential mode protection).

Figure 11:
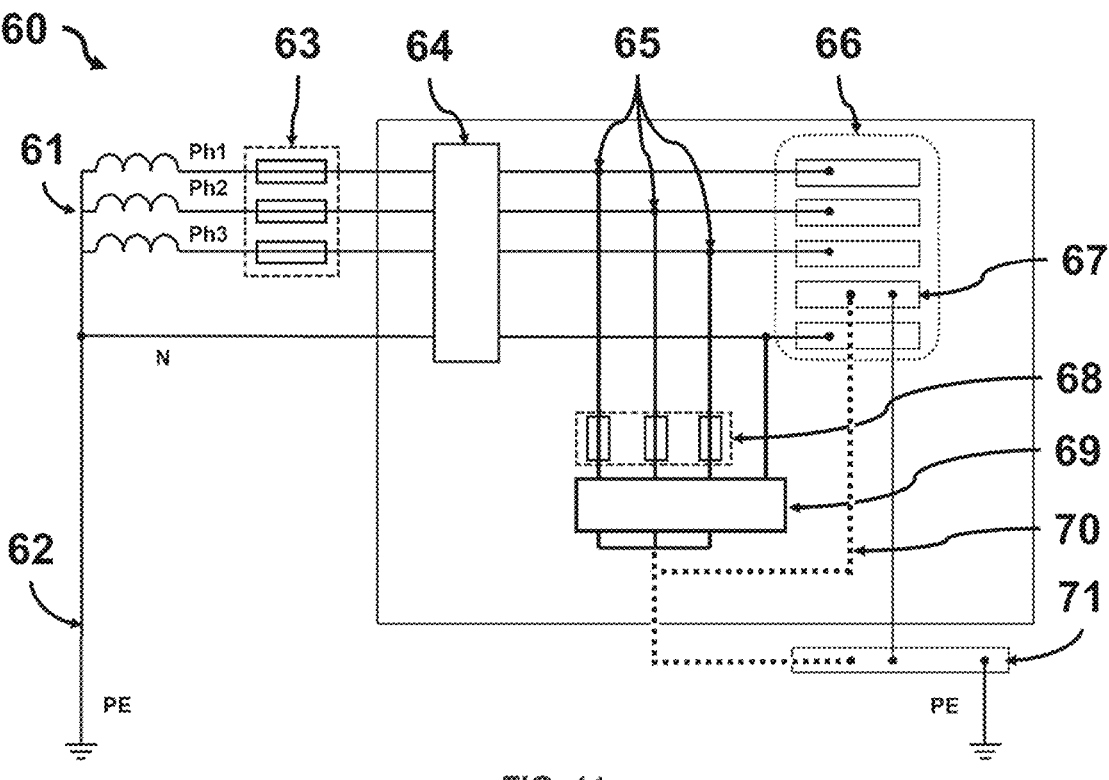
FIG. 11 displays a block diagram of Connection Type 1 (CT 1) surge protection device (SPD) installation in TT electrical system according to an example of the instant disclosure.

Looking to FIG. 11, a generalized diagram of surge protection device (SPD) installation in TT three-phase power systems with Connection Type 1 is presented with a block diagram 60. The SPD 69 is installed between the active power lines 65, the neutral power line, and the ground 71. The SPD 69 is connected after an overcurrent protection device (OCPD) 63 at the three-phase power source 61, a residual current device (RCD) 64, and additional OCPD 68 (optional or embedded in the SPD). The Neutral line of the three-phase electric power source 61 is directly connected to the protective earthing (PE) 62. In FIG. 11, an additional PE 71 is shown and used for grounding connection at the protected electrical load 66 using protective conductor 67, grounding earthing terminal bar 71, and connecting wire 70. The secondary OCPD 68 is optional and may be embedded within the SPD 69. The connecting wires 65 can be used to connect the SPD to each phase line of the three-phase power source. When the protected electrical load is close to the electrical source, the additional earthing bar 71 may not be necessary.

Figure 12:
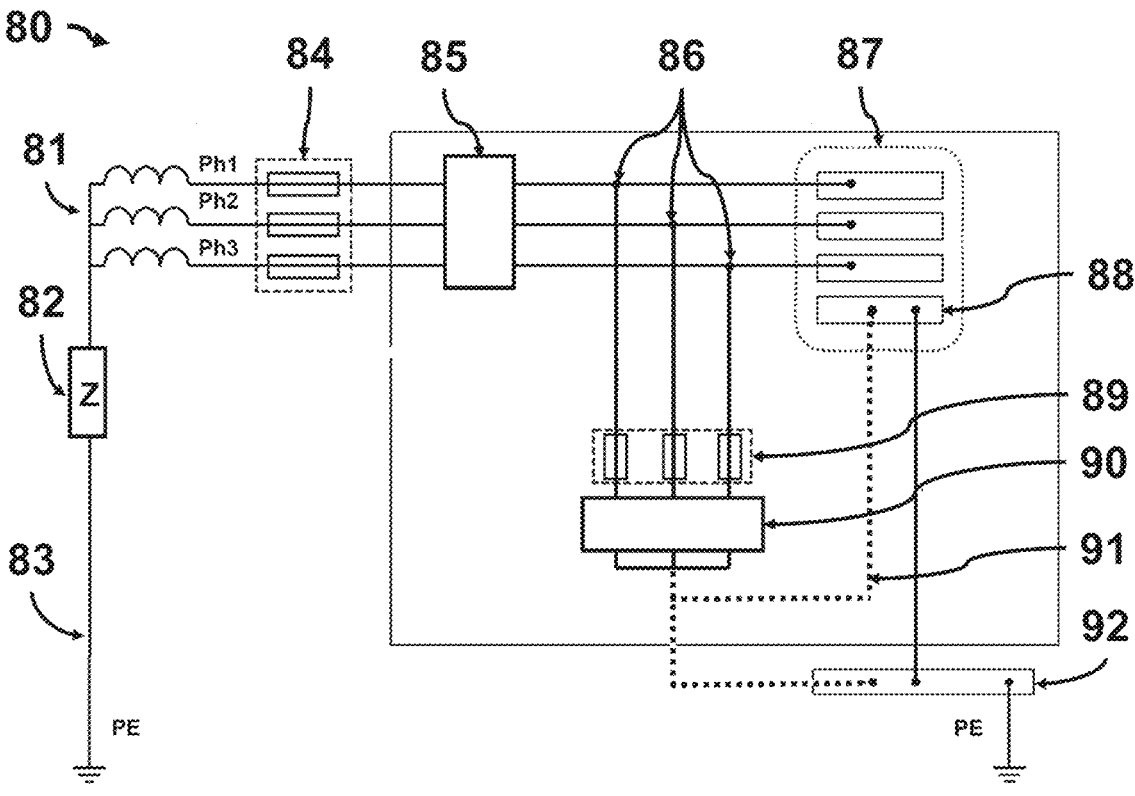
FIG. 12 displays a block diagram of Connection Type 1 (CT 1) surge protection device (SPD) installation in IT electrical system according to an example of the instant disclosure.

Looking to FIG. 12, a generalized diagram of surge protection device (SPD) installation in IT three-phase power systems with Connection Type 1 is presented with a block diagram 80. The SPD 90 may be installed between the active power lines 86 and the ground 92. The SPD 90 may be connected after an overcurrent protection device (OCPD) 84 at the three-phase power source 81, a residual current device (RCD) 85, and additional OCPD 89 (optional or embedded in the SPD). The IT three-phase electric power source 81 is without a Neutral line. The center point of the three phases could be without a solid connection to PE 83 or may have a connection with impedance 82. The SPD can be connected to the power lines with connecting wires 86 to each phase of the three-phase power source. The protective earthing (PE) 92 at the protected electrical load 87 must be present. The protective conductor 88 must be connected to the grounding/earthing bar 92 with appropriate cross-section wire 91 to provide low impedance. In FIG. 12, PE 92 is necessary for the proper installation and function of the transient surge protection.

Figure 13:
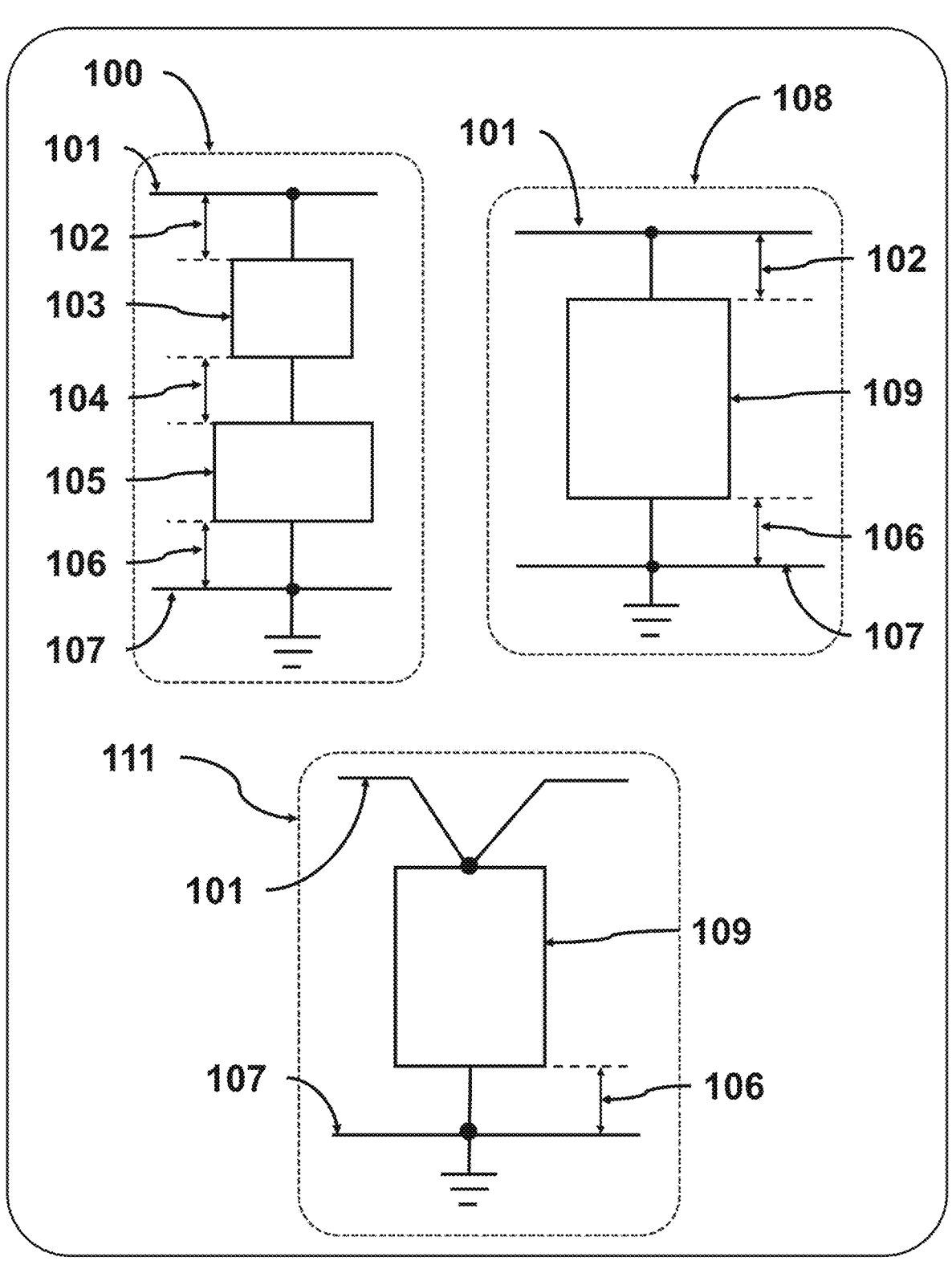
FIG. 13 presents a block diagram of in the surge protection device (SPD) branch by using a dedicated external overcurrent protective device and block diagram 110 of SPD installed between a power line and ground without overcurrent protection, according to an example of the instant disclosure.

Looking to FIG. 13, block diagrams 100, 108, and 111 present example installations of transient surge protection device between the active line 101 and ground line 107 of electric power network. In block diagram 100, the SPD 105 is connected in series with an overcurrent protection device (OCPD) 103. In block diagram 108, the SPD 109 may have an internal (embedded) OCPD or may not have an OCPD, depending on the electrical network configuration, specific application, and installation location with respect to electrical source and protected electrical load. The block diagrams 100 and 108 in FIG. 13 are used to illustrate the presence of connecting wires 102 and 106, and connecting wire 104, when an external OCPD 103 is present.

When installing an SPD, consideration shall be given to limit the total wiring length of conductors between connection points of the SPD assembly and power lines. The total length of connecting wires can be as short as possible and may not exceed 0.5 m or exceed 1.0 m. The main protective conductor can be connected to the earthing terminal located as near as possible to the SPD by adding an intermediate earthing terminal (see FIG. 11). The length (and therefore inductance) of the conductors between the SPDs and the main earthing terminal may be kept to a minimum. SPDs may be connected to the main earthing terminal or to the protective conductor via conductive parts, e.g., the metallic enclosures of the assembly, provided it is connected to ground/protective earthing and meets the requirements for a protective conductor in accordance with governing electrical standards. Connection of the relevant SPD(s) to the main earthing terminal, and in addition to the main protective conductor, may improve the voltage protection level.

If the total wiring length of connecting wires 102, 104, and 106, as shown in block diagrams 100 and 108 in FIG. 13 exceeds 0.5 m, at least one of the following options may be chosen:

an SPD with a lower voltage protection level Up can be used, because one meter length of rectilinear conductor carrying a discharge current of 10 kA (8/20 μs current waveform standard) adds a voltage drop of about 1 kV, install a second coordinated SPD close to the equipment to be protected to adapt the voltage protection level Up to the rated impulse voltage of the equipment to be protected.

use the installation method as shown with block diagram 111 in FIG. 13.

The installation configuration presented with block diagram 111 in FIG. 13 eliminates the connecting wire between the active power line and the SPD. It may be viewed as connection using a wire with a length in order of millimeters and respectively eliminating the voltage drop associated with the inductance of the wire. The importance of reducing and eliminating the parasitic inductance of SPD implementation and installation connection wires are further discussed below.

Looking to FIG. 14, block diagram 120 illustrates a commonly used installation of SPD across the electrical power lines. The diagram displays the installation on a split phase power line with protection assemblies that are connected between the active lines L1 and L2 to Neutral (L1-N, L2-N) between the active lines (L-N) and Neutral line to Ground line (N-G). The connection is completed using wire leads with length L, as shown in diagram 120, and it may not affect the normal operation of low frequency AC power lines (60 Hz or 50 Hz). However, it is not the optimal implementation with respect to transient suppression. While it offers the advantage of a less complex manufacturing and easier installation, the connecting wire leads introduce inductance and propagation delay for the high frequency spectra of transient surges. The wire leads form transmission lines configuration topology that is not optimal when the fast transient HEMP E1 and E2 pulses with high frequency spectra are considered.

The self-inductance of a round wire is presented with equation 122 in FIG. 14. The voltage resulting from the conductor's inductance can be determined by equation 122 as $V_{Lwire} = L_{wire} \, di/dt$, where $L_{wire}$ is the inductance of the wires, and $di/dt$ is the current change with respect to time (current first derivative with respect to time). The total inductance of the conductors is determined by their length and the geometrical configuration. For standard wire configurations that consist of one conductor for each phase, neutral, and ground mode, the voltage drops due to wire inductance is 144 V per meter per 1000 A of the standard 8/20-μs current waveform. For transient with short rise time (HEMP E1 and E2), the voltage drop is higher due to the high value of $di/dt$. Exploring further the effect of mutual inductance of connecting wire leads is beyond the scope of this application.

At high frequencies, the propagation of the EM wave depends on multiple factors. The high frequency content of an EMP (100s MHz) is governed by the wave propagation dependances on the characteristics of the transmission line and any topological, static, or dynamic changes of the transmission line including its characteristic impedance, source, and load impedance. While a properly designed and implemented transient suppression system (TSS) will mitigate the surge voltage and current, across the line installation introduces change of the characteristic impedance of the transmission line and reflected pulse from the TSS back to the power lines. A portion of the transient surge pulse propagates toward the SPD, and a portion continues propagation towards the load.

Depending on the length of the connecting wires, after a round trip delay, the portion of the pulse that reaches the TSS is reflected to the power lines after being suppressed by the TSS. The reflected wave form is superimposed on the incoming waveform. This is illustrated with superimposed simulation plots 121 in FIG. 14, for example, T-tap installation across the lines case with 0.6 m (~2') connection leads at location 1.5 m (~5') in front of the electrical load. The propagation speed (and respectively the propagation delay) on a transmission line is frequency dependent. Reflections from TSS also have a negative magnitude content due to the changed load impedance of TSS after the triggered response of the surge suppression components. As shown in the example, the incoming surge pulse propagates further down the power line towards the electrical load during the propagation time delay from the point of connection on the power lines to the TSS and back to the power lines connection point.

Figure 15:
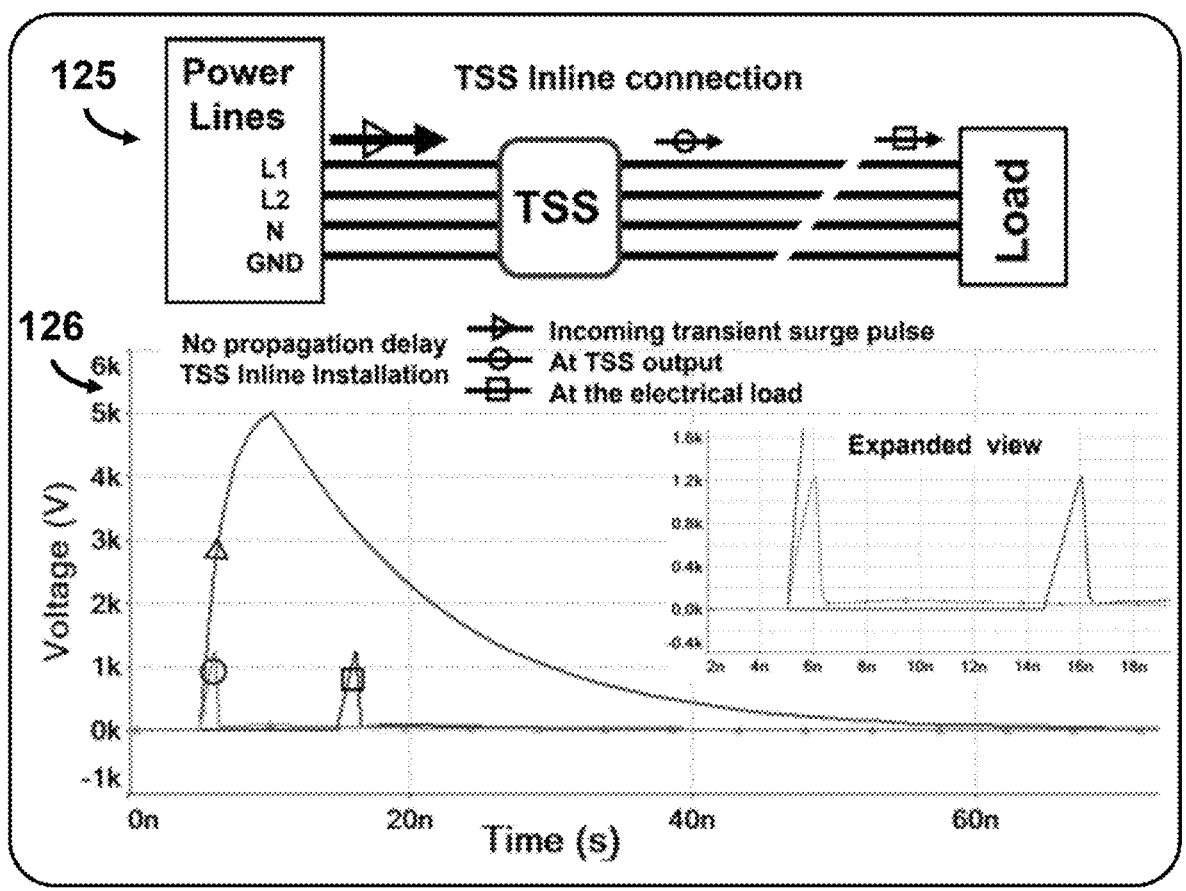
FIG. 15 presents a block diagram of a surge protection device installation directly inline and the simulation plots of the incoming transient pulse and the resulting waveforms due to SPD response without the connecting lead wires inductance, according to an example of the instant disclosure.

Looking to FIG. 15, pictograph 125 displays an inline installation of a transient surge suppression system (TSS) which is used in the methods and systems according to an example of the instant disclosure. This installation does not affect the normal operation of low frequency AC power lines (60 Hz or 50 Hz) and provides the advantage with respect to the high frequency content of the transient surges. In comparison with across the lines connection with wire leads, the inline installation does not result in a T-section (a tab) of the electrical transmission lines. The high frequency content of an (300 MHz and higher for HEMP E1 and GHz for HIRF) is governed by the wave propagation dependances on the characteristics of the transmission line and any topological, static, or dynamic changes of the transmission line including its characteristic impedance, source, and load impedance. Superimposed plots 126 in FIG. 15 display simulation example to illustrate an immediate response of the TSS (the absence of propagation delay). The waveform at the load is almost identical to the waveform at the output of the TSS with minor losses and a propagation delay that depends on the distance of the load from the TSS's inline installation point (as shown in the legend in FIG. 15).

The inline installation protective devices based on the current methods and systems, use components with nonlinear resistance, which is very high during normal operation, minimal parasitic capacitance, and minimal lead inductance of the components used. The important points to note, while comparing the wiring diagrams as illustrated with pictograph 121 in FIG. 14 (across the line installation) and pictograph 126 in FIG. 15 (direct inline installation) are:

the difference in the TSS's response time.

The difference of the transient surge energy propagating to the electrical load (usually referred to as residual current end respectively, residual transient energy propagating after the TSS).

Figure 16:
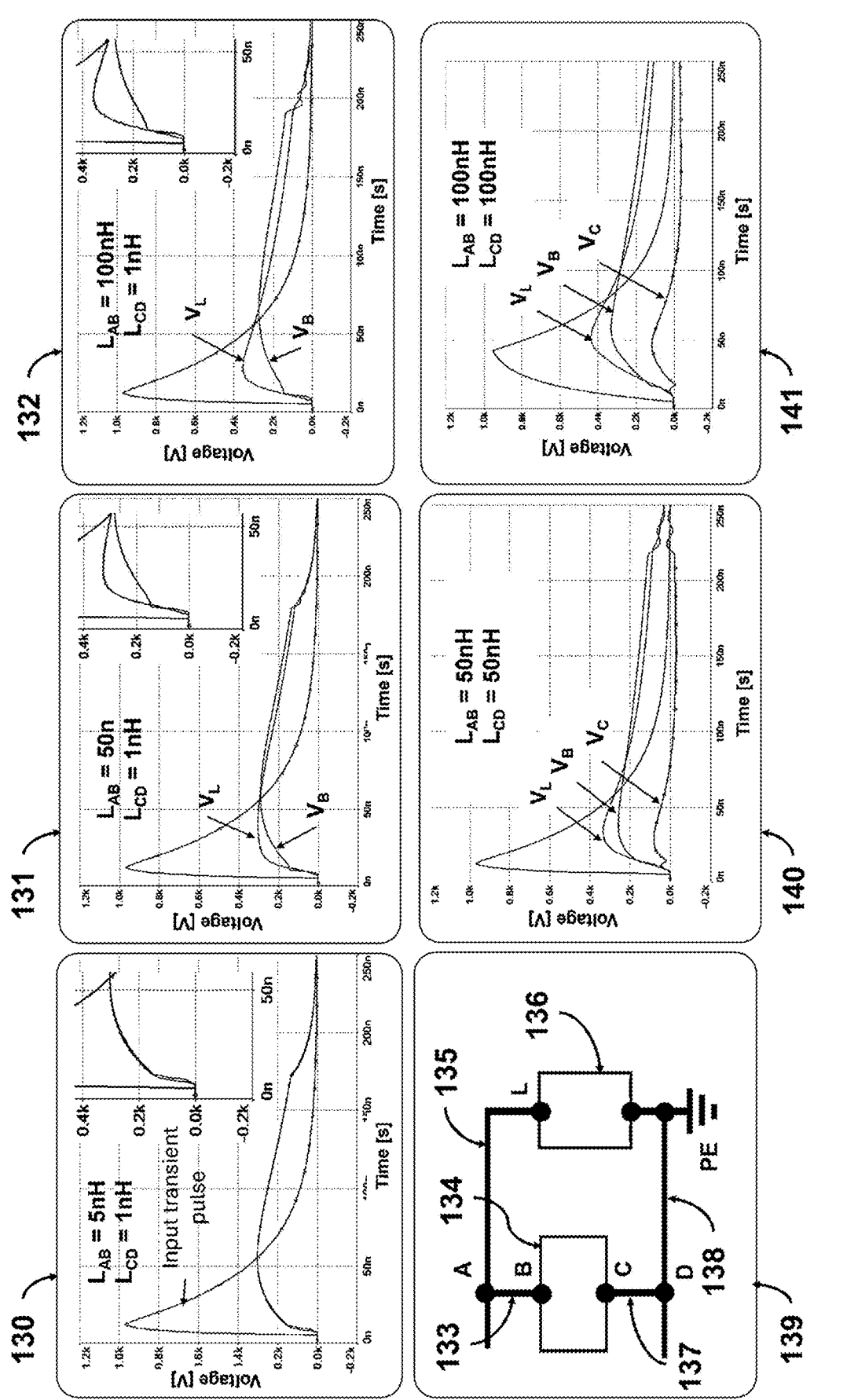
FIG. 16 presents a waveform plot of an input transient pulse and the resulting effects of the stages of a hybrid multistage SPD illustrated with block pictogram, according to an example of the instant disclosure.

Looking to FIG. 16, plots 130, 131, 132, 140, and 141 display examples of transient surge suppression assembly responses and the effect of connecting wire leads inductance. Block diagram 139 is used as reference to the plots' notations of waveforms $V_L$, $V_B$, and $V_C$. Surge suppression assembly (SSA) 134 in block diagram 139 is connected to active power line 135 at point A and to ground power line 138 at point D. The connecting wire leads 133 and 137 of the surge protection (surge suppression) assembly 134 are shown as segments AB and CD, respectively. The inductance of the connecting wire leads depends on their length, cross-section profile and dimensions, as shown previously with analytical expression 122 in FIG. 14. The voltage drop across a connecting wire lead is proportional to its inductance and the rate of change in time of the current passing through the lead wire.

Plot 130 in FIG. 16 illustrates the response of the surge suppressing assembly (SSA) 134 to a transient overvoltage with a peak amplitude of 1 kV and rise time of 5 ns when the connecting lead wire 133 (wire between points A and B in diagram 139) and lead wire 137 (wire between points C and D in diagram 139) are very short and respectively simulated with inductances $L_{AB}$=5 nH and $L_{CD}$=1 nH, where 1 nH=$10^{-9}$ Henry inductance. The insert in plot 130 shows that the SSA responds instantaneously to the transient surge voltage. This is not the case when the connecting lead wires are longer and respectively higher inductance which results in a high voltage drop across the connecting wire. The voltage trace $V_L$ in plot 131 for voltage at the connecting point of load 136 to active wire 135 in diagram 139 differs from the voltage trace $V_B$ measured at the connecting point B as shown in diagram 139 in FIG. 16, The plot 131 displays the response to the same overvoltage transient surge with a connecting wire 133 in plot 139, FIG. 16 with 50 nH inductance. The connection wire lead of the SSA to ground wire 138 in diagram 139, shown with wire segment 137 in plot 139, may have inductance 1 nH for plots 130, 131, and 132.

As expected, the increased inductance of connecting wire 133 to active line 135 increases the voltage drop across the wire and the voltage difference between the load connection and SSA 134 connection to active line 135 increases as illustrated in plot 132. In this plot, the connecting wire lead 133 has 100 nH. The voltage trace $V_L$ in plot 132 has peak amplitude above the limiting threshold voltage level of SSA 134 responding to the transient overvoltage and shown with voltage trace $V_B$ measured at the connecting point B as shown in diagram 139 in FIG. 16, The inserts in plots 131 and 132 display zoomed in views of the voltage differences during the response time when current passes through the connecting lead wire with a rate of change dI/dt which has a large value for transient analogous to HEMP E1 and E2 and lightning strikes.

The voltage traces in plots 140 in FIG. 16 are for SSA installation with connecting wire leads with inductance $L_{AB}$ of 100 nH between SSA 133 and active power line 135 and Len of 100 nH between SSA 133 and ground power line 138. As noted herein, it is a common practice to have across the power line installation (T-tab connection) of SPD with connecting wire leads of the same length and respectively inductance. The voltage drops across connecting wire segment 137 in plot 139 and adds voltage trace $V_C$ in plot 140 and plot 141. In these plots the voltage trace $V_B$ is elevated above voltage trace Ve with the voltage drop across the SSA 133 between points B and C. This voltage differential results from the current flowing through the SSA. While the connecting wire lead inductances in plot 141 are the same as in plot 140, the transient overvoltage surge pulse is 1 kV peak amplitude with 30 ns rise time and longer duration.

Figure 17:
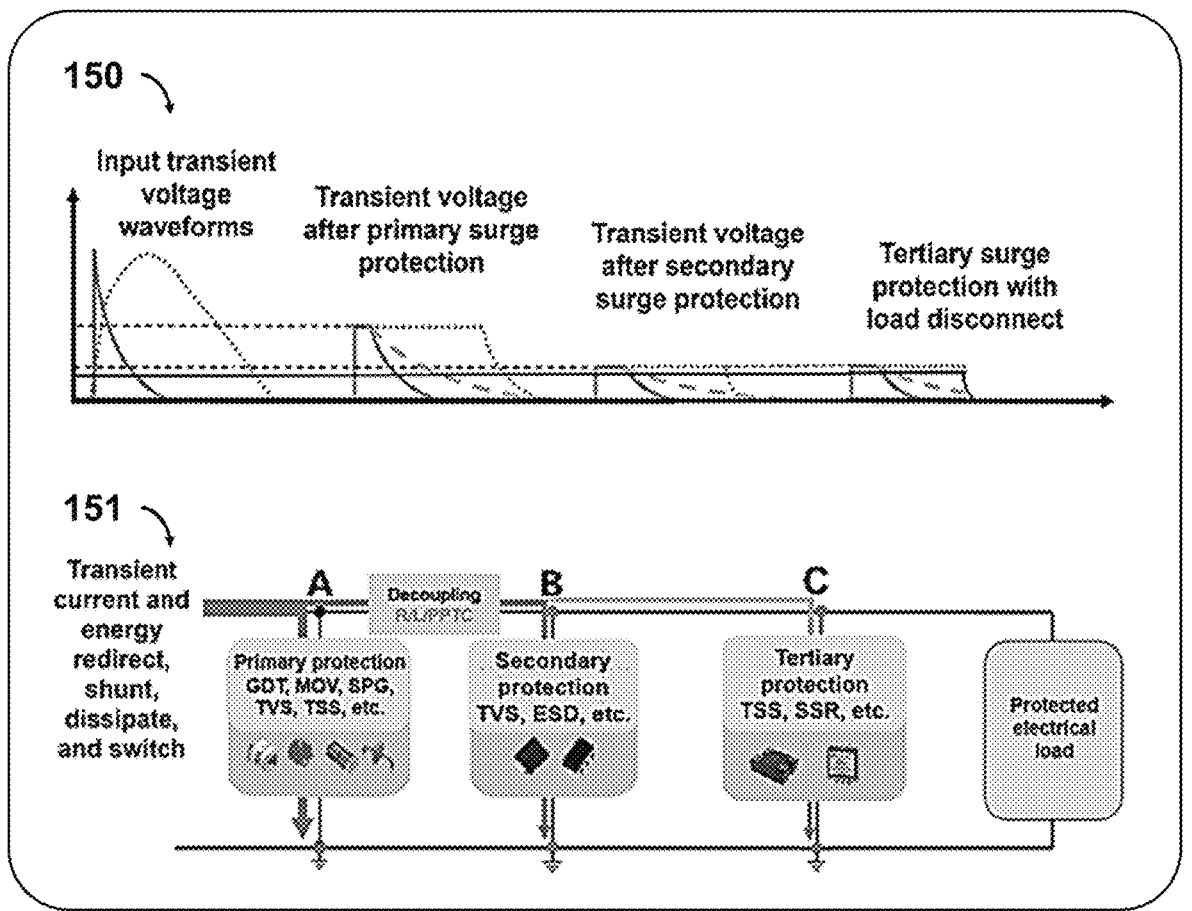
FIG. 17 presents a pictograph of example input transient surges and their waveforms after the primary, secondary, and tertiary surge protection assemblies, which are also illustrated with a pictograph, according to an example of the instant disclosure.

Looking to FIG. 17, plot 150 displays the limiting, absorbing, and shunting of example transient surges by three surge suppressing assemblies (SSAs) which form a three-stage hybrid surge protection device (SPD) shown in diagram 151. The SSAs connected at point A, B, and C between the active power line and the ground power line in plot 151 of FIG. 13, form coordinated primary, secondary, and tertiary protection assemblies. There are multiple components available to the designer of a TSS to address the specific needs and requirements. The complete list of components, including transient voltage suppressors (TVSs), metal oxide varistors (MOVs), gas discharge tubes (GDTs), other solid state and nonlinear components based on semiconductors (i.e., Si, Ge), compound semiconductors (i.e., SiC, GaN, GaAs) and metamaterials, mechanical, electrical and ionization discharge devices (IDDs), and combinations thereof, is beyond the scope of this application.

Plot 150 in FIG. 17 illustrates that the voltage threshold of the primary protection is above the triggering threshold level of the secondary protection. The coordination of the three stages addresses the need for fast response to transient overvoltage with high capacity current (energy) handling capability of the SPD. In this regard, the primary surge protection is implemented with fast response components. The secondary surge protection is implemented with an overvoltage threshold level below the primary surge protection and with a high current capacity. The tertiary stage further supplements the current (energy) absorption and shunting capacity with additional functionality to disconnect the protected load after a predefined time interval in case of a long-lasting overvoltage transient such as HEMP E3 and a Geomagnetic disturbance generated transient.

The pictograph 151 in FIG. 17 refer to the transient suppression assemblies comprising plurality and combinations of transient voltage suppressors (TVSs), metal oxide varistors (MOVs), gas discharge tubes (GDTs), glass GDTs, avalanche transistors (ATs), spark gap protectors (SPG) and thyristor surge suppressors (TSS), other solid state and nonlinear components based on semiconductors (i.e., Si, Ge), compound semiconductors (i.e., SiC, GaN, GaAs) and metamaterials, mechanical, electrical and ionization discharge devices (IDDs), and combinations thereof. The TVSs have a characteristic fast response time but relatively limited energy absorption capacity. The MOVs and GDTs provide high-capacity energy shunting capability. With the continued advancement of material sciences, optimized technologies produce components with better parameters and new components that provide more advanced solutions for TSSA implementation. In this regard, the wide bandgap semiconductors, and the development of compound semiconductors with groups III-IV elements are very promising to provide new components with fast response and energy handling capacity.

Figure 18:
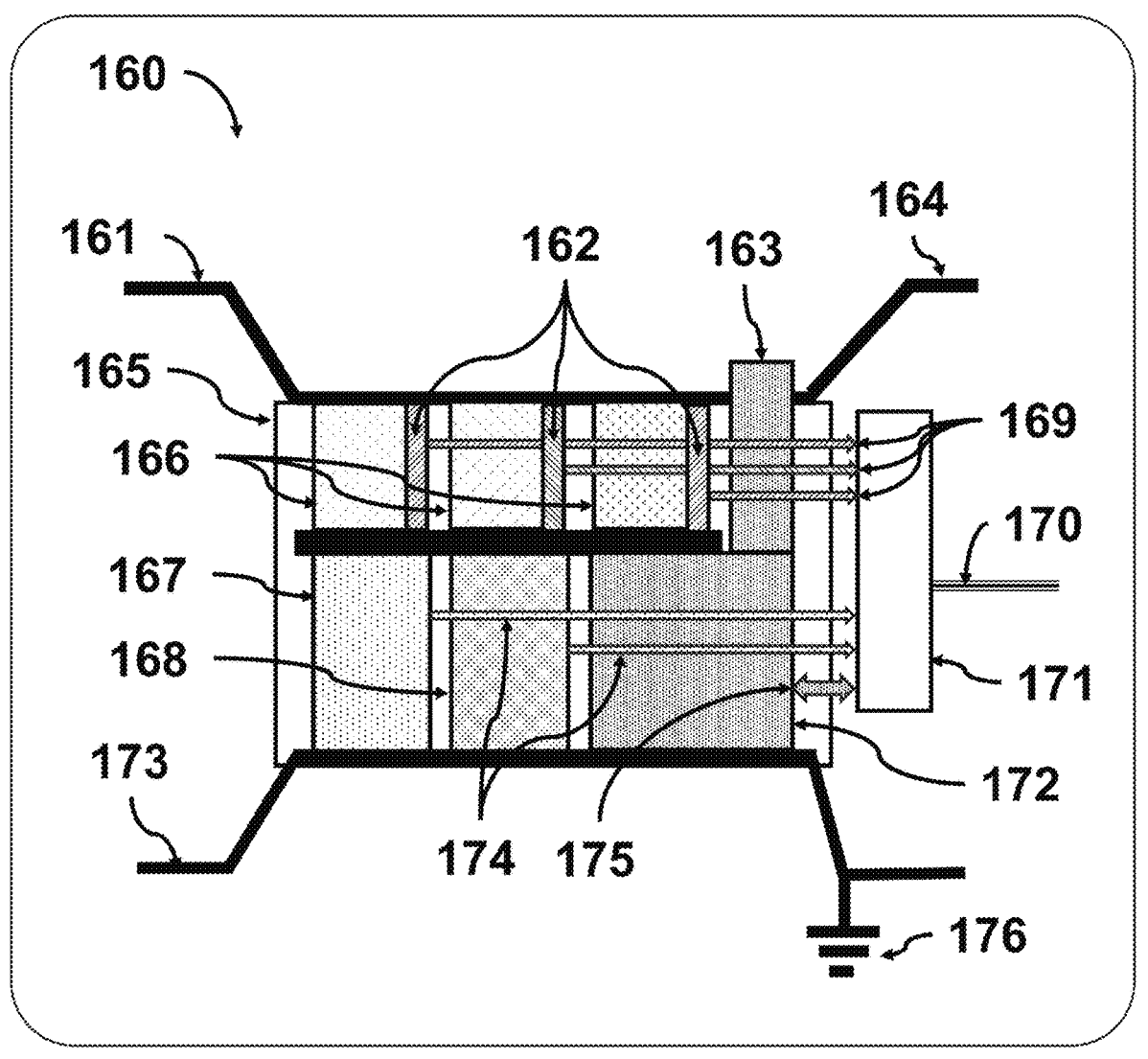
FIG. 18 presents a block diagram of a surge protection device connected directly between active power line and ground power line according to an example of the instant disclosure.

Looking to FIG. 18, block diagram 160 shows a surge protection device (SPD) 165 installed using direct inline connection between an active power line 161 and ground power line 173 and protecting earthing 175. Based on the previous discussions, this installation may eliminate the inductance from connecting wire leads. SPD 162 comprises primary surge protection assembly (SPA) 167, secondary SPA 168, and tertiary SPD 172. Instantaneous status of SPAs is communicated via signal buses 174 to local indicator 171. Dedicated overcurrent protection subassemblies 166 for each SPA 167, 168, and 172, are internal to the SPD 165. Status monitoring and display subassembly 162 for each 167, 168, and 172 SPAs, monitor the residual current of SPAs and displays their status via signal buses 169 for local indicator 171.

Tertiary surge protection assembly 172 provides the capability to disconnect the protected electrical load after a predefined time interval via electronic switching subassembly 163 and to communicate the disconnected status of overvoltage exceeding predefined duration time to local indicator 171 and to a remote location using communication bus 170. The protected electrical load is connected between segment 164 of active power line 161 and ground power line 173. Active power line segment 164 is reconnected to active power line 161 when the power line condition returns to normal. The location of protective earthing (PE) 175, which the ground wire 173 is connected, is the power source earthing ground, when the electrical load is close to the power source, or an additional PE is located close to the surge protection device.

The methods and systems discussed herein provide protection to electrical and electronic devices connected to an electrical infrastructure network without interfering with the performance of the protected system. The embedded TSS protects the connected electrical and electronic loads by limiting and absorbing the energy of the transient surge pulses before they can reach the protected infrastructure. The system can be extended to provide an enhanced protection from EM energy interference with AC and DC electrical networks. As an example, an emphasis is given on the advantages of the inline BTSD connection, in general, and more specifically, inline load dedicated distributed TSS.

The methods and systems provide for protection from the effects of excessive EM energy with flexibility of installation and inline interconnection. This hybrid technology approach is based on appropriate combination of technology elements to form surge protection assemblies which are embedded as encased devices. The direct connection to power lines provides instantaneous response to overvoltage surges without a delay associated with wire propagation delay and voltage drops associated with connecting wire inductance. The easy inline installation of embedded overcurrent protection provides utility for enhanced distributed protection on multiple points of the electrical network using coordinated surge protection devices. This is opposite to a single across-the-lines installation of a high-capacity SPD with lead wires.

The connecting long-lead wires of commercially available devices act as additional radiation induction pathways. In such regard, for vehicles for example, the described system enhances and augments the typical at-the-battery installation with a distributed at-the-point-of-interest load-specific SPD. With respect to small-size electrical utility devices with power distribution lines (mini-grid equipment, electrical generators, backup power systems, etc.), the disclosed methods and systems provides several advantages. Each surge protection device has a dedicated properly sized overcurrent protection and surge protection capacity level. Hybrid multistage surge protection assemblies provide rapid response, enhanced current capacity, residual current monitoring, status display, and electrical load disconnect.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A method for suppressing an electrical surge, induced by a transient electromagnetic energy disturbance, generated by a high-altitude nuclear weapon detonation (HEMP), intentional electromagnetic interference (IEMI) using directed energy electromagnetic warfare weapons, and naturally occurring events comprising lightning strikes, solar corona mass ejection (CME) resulting in Geomagnetic disturbance (GMD), from reaching electrical and electronic devices connected to an alternating current (AC) or a direct current (DC) electrical power network (EPN), the method comprising:

responding instantaneously to an overvoltage exceeding a predetermined threshold level T1 induced by an electromagnetic pulse in the electrical power network (EPN), providing power to a connected electrical load, using an embedded surge protection device (ESPD) installed directly inline eliminating connecting wires propagation delay;

the embedded surge protection device (ESPD) for inline installation responding instantaneously to the overvoltage comprises limiting, absorbing, switching, and shunting the transient surge energy, when the overvoltage exceeds the predetermined threshold level T1, to limit the overvoltage to a magnitude of the predetermined threshold level T1, to indicate the overvoltage exceeding the predetermined threshold level T1, and to redirect the transient overcurrent to ground, using a primary transient surge suppressing assembly comprising direct inline installation with ultra-low parasitic inductance connections of at least one of transient energy limiting, absorbing, switching, and shunting components assembly with a transient current capacity scaled with the current and time response rating of a primary embedded overcurrent protection;

responding instantaneously to an overvoltage exceeding a predetermined threshold level T2, lower than the predetermined threshold level T1, induced by a sequential or enduring in time component of the electromagnetic pulse in the EPN, providing power to a connected electrical load, by an embedded surge protection assembly installed directly inline, eliminating connecting wires propagation delay;

the embedded surge protection device for inline installation responding to a lower level overvoltage at threshold T2, including overcurrent protection and decoupling, limiting, absorbing, switching, and shunting the transient surge energy and lowering the overvoltage to magnitude of the predetermined threshold level T2, to indicate the overvoltage exceeding the predetermined threshold level T2, and to redirect the transient overcurrent to ground, using a secondary transient surge suppressing assembly comprising direct inline installation with ultra-low parasitic inductance connections of at least one of transient energy limiting, absorbing, switching, and shunting components assembly with a transient current capacity scaled with the current and time response rating of secondary embedded overcurrent protection;

responding instantaneously to a continuing overvoltage exceeding a predetermined threshold level T3, lower or equal to the predetermined threshold level T2 for a predetermined time duration D, the overvoltage being induced by a sequential or an enduring in time component of the electromagnetic energy transient in the EPN, connected to power a dedicated electrical load, by the embedded surge protection assembly installed directly inline, eliminating connecting wire propagation delay; and the embedded surge protection device for inline installation responding to an overvoltage at threshold T3, including limiting, absorbing, switching, and shunting the transient surge energy, lowering the overvoltage to the predetermined threshold level T3, to indicate the overvoltage exceeding the predetermined threshold level T3, and to redirect the transient overcurrent to ground, and disconnecting the dedicated electrical load after a time duration exceeding the predetermined time duration D, using a tertiary transient surge suppressing assembly comprising direct inline installation with ultra-low parasitic inductance connections of at least one of transient energy limiting, absorbing, switching, and shunting components assembly with a transient current capacity scaled with the current and time response rating of a tertiary embedded overcurrent protection, and disconnecting components solid state relay, solid-state switches, and electro-mechanical switches, wherein the electrically connected primary, secondary, and tertiary transient surge suppressing assemblies (TSSAs) are installed directly inline powering the protected electrical load, eliminating response delay and additional voltage generation resulting from parasitic inductance of connecting wires and the transient current change in time, and providing embedded overcurrent limiting protection, forming an embedded hybrid transient suppression device (EHTSD) with mutually scaled current handling capacity, connected directly inline.

2. The method for suppressing an electrical surge as in claim 1, comprising electrically connected primary, secondary, and tertiary coordinated transient surge suppressing assemblies (TSSAs), embedded overcurrent protection, and disconnecting a connected electrical load after overvoltage time duration exceeding the predetermined time duration, using the tertiary transient surge suppressing assembly including at least one of solid-state relay, solid-state switch, and electro-mechanical switch and forming an embedded hybrid transient suppression device (EHTSD) with an electronic, self-resetting circuit breaker, eliminating the need of a power line thermal or wire filament fuse.

3. The method for suppressing an electrical surge as in claim 1, wherein the inline insertion of the embedded hybrid transient suppression device, without connecting wire propagation delays, comprising primary, secondary, and tertiary transient surge suppressing assemblies, is replacing a power line current limiting fuse with an electronic, self-resetting circuit breaker switch, respectively, comprising three staged protective assemblies, the staged protective assemblies comprising:

the primary transient surge suppressing assembly having an instantaneous response to high-level, short-duration overvoltage exceeding the predetermined threshold level T1, indicating the overvoltage exceeding the predetermined threshold level T1, without generating additional voltage resulting from added inductance of connecting wires and the transient current change with respect to time;

the secondary transient surge suppressing assembly having an instantaneous response to intermediate-level, intermediate-duration overvoltage exceeding the predetermined threshold level T2, indicating the overvoltage exceeding the predetermined threshold level T2, without generating additional voltage resulting from added inductance of connecting wires and the transient current change with respect to time;

the tertiary transient surge suppressing assembly having a response to lower-level, long-duration overvoltage exceeding the predetermined threshold level T3 while monitoring the indication for transient voltage exceeding the predetermined threshold levels T1 and T2 and adjusting accordingly the predefined time duration D, without generating additional voltage drop resulting from added inductance of connecting wires and the transient current change with respect to time; and the tertiary transient surge suppressing assembly having a response to lower-level, long-duration overvoltage exceeding the predetermined threshold level T3 for the adjusted time duration D when overvoltage above threshold levels T1 and T2 are indicated, further comprising disconnecting the dedicated electrical load when the transient surge overvoltage exceeding the predetermined threshold level T3 persists longer then the adjusted time duration D and connecting the dedicated electrical load when an overvoltage condition is not present.

4. The method for suppressing an electrical surge as in claim 1, wherein the inline installation of the embedded hybrid transient suppression device comprising a hybrid protective device with primary, secondary, and tertiary transient surge suppressing assemblies eliminates connecting wire propagation delay without interference with normal operation of the connected electrical load, further comprising:

embedded electronic circuit breaker function disconnecting the electrical load when the overvoltage exceeds a predetermined time duration, and automatically reconnecting the dedicated electrical load after the transient overvoltage condition has passed;

protecting the connected electrical load and the electrical power source of the electrical network during a transient surge overvoltage and forming an electronic circuit breaker with a self-adjusting response time; and providing continuity of operation after a transient surge overvoltage.

5. The method for suppressing an electrical surge as in claim 1, wherein the embedded hybrid transient suppression device for inline insertion without connecting wire propagation delay comprising primary, secondary, and tertiary transient surge suppressing assemblies with ultra-low parasitic inductance connections and direct inline installation further comprises mutually scaled current capacity, respectively, and limited mutual operational degradation when limiting, absorbing, switching, shunting, disconnecting, and reconnecting, respectively, the protected electrical load.

6. The method for suppressing an electrical surge as in claim 1, further comprising means for mounting the embedded hybrid transient suppression device in a casing with form factor and interoperable hardware connections with matched voltage and current ratings and interface connections based on electrical code and standards.

7. The method for suppressing an electrical surge as in claim 1, wherein the embedded hybrid transient suppression device with the primary, secondary, and tertiary transient surge suppressing assemblies (TSSAs), mounted in the casing, comprise TSSAs mounted on a printed circuit board (PCB) with electrical interface connectors configured to connect to power distribution conductors utilizing terminal connectors, splice connections, and other connectors specified by existing consumer and industrial electrical standards, electrical connectors, and proprietary custom connectors for inline insertion installation with current capacity scaled with the TSSAs and the protected electric network.

8. The method for suppressing an electrical surge as in claim 7, wherein the embedded hybrid transient suppression device with the casing and the electrical interface connectors is operable for direct inline insertion without connecting wire propagation delay installation on the electrical power network (EPN) at an AC or DC power source, at an electrical load, and inline distributed installation at midspan points on an EPN branch.

9. The method for suppressing an electrical surge as in claim 7, wherein additional embedded hybrid transient suppression device for direct inline insertion without connecting wire propagation delay installation is installed on the electrical power network (EPN) at an AC or DC power source, at an electrical load, and inline distributed installation at midspan points on an EPN branch to increase the transient surge protection capacity.

10. The method for suppressing an electrical surge as in claim 1, wherein each of the embedded hybrid transient suppression device with the primary, secondary, and tertiary TSSAs, replacing a current limiting circuit breaker, includes a plurality of limiting, absorbing, switching, shunting, disconnecting, and reconnecting type devices, in addition to standardly used transient voltage suppressors, metal oxide varistors, gas discharge and glass gas discharge tubes, avalanche diodes and transistors, spark gap protectors, and ionization discharge devices, also include at least one component based on newest wide-bandgap compound semiconductor materials, and at least one solid-state relay, solid-state switch, electro-mechanical switch, and combinations thereof, scalable for voltage, current, and energy handling capacity.

11. The method for embedded inline suppressing an electrical surge as in claim 1, wherein the primary, secondary, and tertiary TSSAs have components with inherently varied response times and are selected with the predetermined threshold levels have values $T1 > T2 \geq T3$, respectively, and are operable to react to and suppress primarily one of the $E1$, $E2$, and $E3$ component pulses of the high-altitude EMP (HEMP), respectively, without time delay response associated with length of connecting lead wires and without creating additional voltage resulting from added connecting wire inductance and the transient current change with respect to time.

12. The method for suppressing an electrical surge as in claim 1, wherein the primary, secondary, and tertiary TSSAs include components to protect against high voltage transients, induced by intentional electromagnetic interference and naturally occurring events, wherein:

the tertiary TSSA provides protection to electrical load with a soft power disconnect after a predetermined surge overvoltage time duration, associated with HEMP E3, after threshold levels T1 and T2 are indicated;

the tertiary TSSA provides protection to electrical load with a soft power disconnect after an adjusted surge overvoltage time duration, when overvoltage above threshold levels T1 and T2 are not present, indicating an overvoltage surge associated with Geomagnetic disturbance induced current, and the tertiary TSSA connecting the protected electrical load to the electrical network power source, when an overvoltage condition is not present.

13. The method for suppressing an electrical surge as in claim 10, wherein the embedded hybrid transient suppression device (EHTSD) comprising bulk components, based on newest wide-bandgap compound semiconductor materials, at least one solid-state relay, solid-state switch, and electro-mechanical switch, and operational status display, comprises at least one serviceable and replaceable component extending the use of the EHTSD.

14. The method for suppressing an electrical surge as in claim 10, wherein the embedded hybrid transient suppression device comprising at least one component based on compound semiconductors AlGaN/GaN, GaA, and ultra-wide bandgap semiconductors $Ga_2O_3$, diamond, and AlN.

15. A system for suppressing an electrical surge induced by a transient electromagnetic energy disturbance, the system comprising:

embedded surge protection assembly (ESPA) of a surge protection device (ESPD) for inline installation, responding to an overvoltage exceeding a predetermined threshold level T1, induced by an electromagnetic pulse in an electrical power network providing power to connected electrical load, the ESPD for inline installation responding instantaneously to the overvoltage comprising overcurrent protection and limiting, absorbing, switching, and shunting the overvoltage after the overvoltage exceeds the predetermined threshold level T1 to limit the overvoltage magnitude to the predetermined threshold level T1 using a primary transient surge suppressing assembly comprising at least one of transient surge suppressing assemblies using bulk semiconductor components based on compound semiconductors GaN, AlGaN/GaN, and GaA, ultrawide bandgap semiconductors Ga2O3, diamond, and AlN, and transmission line segments, based on distributed non-linear metamaterials;

a secondary embedded transient surge suppressing assembly of the ESPD comprising at least one of transient surge suppressing assemblies using bulk semiconductor components, based on compound and ultrawide bandgap semiconductors, and transmission line segments, based on distributed non-linear metamaterials, responding at a predetermined threshold level T2 to overvoltage induced in the EPN, by a sequential or enduring in time component of the electromagnetic pulse, and providing an overcurrent protection, decoupling, limiting, absorbing, switching, and shunting the associated overcurrent, limiting the overvoltage magnitude to the predetermined threshold level T2, lower than the predetermined threshold level T1; and a tertiary embedded transient surge suppressing assembly of the ESPD comprising at least one of transient surge suppressing assemblies using bulk semiconductor components, based on compound and ultrawide bandgap semiconductors, and at least one solid-state relay, solid-state switch, and electromechanical switch responding to overvoltage at a predetermined threshold level threshold T3, including limiting, absorbing, switching, and shunting the associated overcurrent, limiting the overvoltage magnitude to the predetermined threshold level T3, lower or equal to the predetermined threshold level T2, and disconnecting the connected electrical load after a time duration exceeding a predetermined time interval D, the overvoltage exceeding the predetermined threshold level T3 being induced by a sequential in time component of the electromagnetic pulse in the EPN connected to and powering the electrical load, wherein the electrically connected primary, secondary, and tertiary embedded transient surge suppressing assemblies (ESPAs) are installed directly inline, replacing a power line circuit breaker, to form an embedded hybrid transient suppression device (EHTSD) and providing transient voltage surge and overcurrent protection to the electrical power network, associated power source, electrical and electronic load with an inline insertion connection such that the EHTSD is properly scaled to the electrical power source, the transmission line, and the load characteristic specifications and the EHTSD for inline insertion connection with the primary, secondary, and tertiary transient surge suppressing assemblies have mutually scaled current capacity ratings, respectively, limiting mutual operational degradation when limiting, absorbing, switching, and shunting, respectively, connecting and disconnect the protected electrical load forming an embedded self-resetting electronic circuit braker.

16. The system for suppressing an electrical surge induced by a transient electromagnetic energy disturbance as in claim 15 comprising embedded surge protection assemblies (ESPAs) with the threshold levels T1, T2, and T3 and disconnecting the dedicated electrical load when the overvoltage is exceeding the predetermined threshold level T3 after a time duration exceeding a predetermined time interval D, comprises capabilities to the threshold levels T1 and T2, and to detect when the surge overvoltage exceeds a threshold level T1 and a threshold level T2, to adjust the time interval D in accordance to the electrical power network and the connected electrical load.

17. The system for suppressing an electrical surge induced by a transient electromagnetic energy disturbance as in claim 15 comprising embedded surge protection assemblies (ESPAs) with the threshold levels T1, T2, and T3 and disconnecting the dedicated electrical load when the overvoltage is exceeding the predetermined threshold level T3 after a time duration exceeding a predetermined adjustable time interval D, comprises capabilities to reconnect the protected electrical load in accordance to the electrical power network and the connected electrical load requirements.

18. The system for suppressing an electrical surge induced by a transient electromagnetic energy disturbance as in claim 15 comprising embedded surge protection assemblies (ESPAs) with the scalable threshold levels T1, T2, and T3, is compatible for use with shielded environments.

19. The system for suppressing an electrical surge induced by a transient electromagnetic energy disturbance as in claim 15, comprising embedded surge protection assemblies (ESPAs) with the threshold levels T1, T2, and T3, and mounted in pressure-rated enclosure, is congruent for installation on underground and underwater submersible electrical networks.

20. The system for suppressing an electrical surge induced by a transient electromagnetic energy disturbance as in claim 15, comprising embedded surge protection assemblies (ESPAs) with the threshold levels T1, T2, and T3, and local status indicator with communication bus for a remote status display.

\* \* \* \* \*